United States Patent
Eastlack

(10) Patent No.: US 8,358,103 B2
(45) Date of Patent: Jan. 22, 2013

(54) AUTOMATIC COUPLING OF AN ALTERNATING CURRENT POWER SOURCE AND AN INDUCTIVE POWER APPARATUS TO CHARGE A TARGET DEVICE BATTERY

(75) Inventor: Jeffrey Raymond Eastlack, Austin, TX (US)

(73) Assignee: Vampire Labs, LLC, Austin, TX (US)

( * ) Notice: Subject to any disclaimer, the term of this patent is extended or adjusted under 35 U.S.C. 154(b) by 805 days.

(21) Appl. No.: 12/511,069

(22) Filed: Jul. 29, 2009

(65) Prior Publication Data

US 2010/0001685 A1    Jan. 7, 2010

Related U.S. Application Data

(63) Continuation-in-part of application No. 12/497,859, filed on Jul. 6, 2009, now Pat. No. 8,232,775.

(60) Provisional application No. 61/084,616, filed on Jul. 29, 2008, provisional application No. 61/078,365, filed on Jul. 4, 2008.

(51) Int. Cl.
 *H02J 7/00* (2006.01)
 *H02J 7/16* (2006.01)
 *H02J 7/04* (2006.01)

(52) U.S. Cl. ........ 320/108; 320/132; 320/136; 320/152; 320/157; 320/162

(58) Field of Classification Search .................... 320/108
 See application file for complete search history.

(56) References Cited

U.S. PATENT DOCUMENTS

| 7,872,447 | B2 * | 1/2011 | Morita et al. | 320/122 |
|---|---|---|---|---|
| 8,183,827 | B2 * | 5/2012 | Lyon | 320/108 |
| 2009/0251100 | A1 * | 10/2009 | Incledon et al. | 320/106 |
| 2011/0187315 | A1 * | 8/2011 | McGinley et al. | 320/107 |

OTHER PUBLICATIONS

Green Plug, http://www.greenplug.us/ , p. 1, (Last Visited Jul. 9, 2009).
The Carphone Warehouse, Eco Charger Samsung, http://www.carphonewarehouse.com/phone-accessories/chargers-batteries/mains-chargers/buy/SAMSUNG-ECO-CHARGER;jsessionid=796E03F64DC0F98CA5A15 p. 1, (Last Visited Jul. 9, 2009).
GADGETS.CO.UK, Green Mobile Phone Charger, http://www.gadgets.co.uk/item/GREENCHARGER/Green-Mobile-Phone-Charger.html pp. 2, (Last Visited Jul. 9, 2009).
Good for You, Good for the Planet, http://www.gfy-gfp.com/eng/zero.html , pp. 4, (Last Visited Jul. 9, 2009).

* cited by examiner

*Primary Examiner* — Edward Tso
*Assistant Examiner* — Ahmed Omar

(57) ABSTRACT

Several methods and systems to perform automatic coupling of an alternating current power source and an inductive power apparatus to charge a target device battery are disclosed. In an embodiment, an inductive battery charging system includes a connection module to determine when a target device is coupled to a charging apparatus comprised of an inductive power apparatus. The system further includes a monitoring module to determine when a target device battery is below a charging threshold while using power from a supplemental power source. In addition, the system includes an activation module to automatically couple the inductive power apparatus and an alternating current power source when a power level of the target device battery is below the charging threshold.

14 Claims, 16 Drawing Sheets

AUTOMATIC COUPLING OF AN ALTERNATING CURRENT POWER SOURCE AND AN INDUCTIVE POWER APPARATUS TO CHARGE A TARGET DEVICE BATTERY

CLAIM OF PRIORITY

This application claims the benefit of U.S. Provisional Application No. 61/084,616, filed on Jul. 29, 2008. This application is also a continuation-in-part of U.S. patent application Ser. No. 12/497,859, entitled "Limitation of Vampiric Power Consumption With Decoupling of an Inductive Power Apparatus and an Alternating Current Power Source," filed on Jul. 6, 2009, now U.S. Pat. No. 8,232,775 which claims the benefit of U.S. Provisional Application No. 61/078,365, filed on Jul. 4, 2008.

FIELD OF TECHNOLOGY

This disclosure relates generally to battery charging technology, and in particular to automatic coupling of an alternating current power source and an inductive power apparatus to charge a target device battery.

BACKGROUND

A system to decouple an inductive charging unit and an alternating current power supply may use an external input to initiate a coupling operation to allow a charging operation to occur. The system may decouple the inductive charging unit and the alternating current power supply to prevent a vampiric power loss that may otherwise be consumed by the inductive charging unit. After the inductive charging unit and the alternating current power supply have been decoupled, if the external input is not received, the system may allow a battery of a charging target device to be used until a power level of the battery falls below a desired power threshold while it is connected to the inductive charging unit. As a result, the target device may have insufficient power to operate for a desired period of time when it is disconnected from the inductive charging unit.

An alternate system to charge the target device may be used to maintain the power level of the battery of the target device above a desired power threshold, which may limit the ability of the system to prevent a vampiric power loss that may be consumed by an alternate inductive charging unit. The alternate inductive charging unit may consume the vampiric power regardless of whether the battery is coupled to the alternate inductive charging unit. The consumption of the vampiric power by the alternate inductive charging unit may contribute to an aggregate power waste of a household, a community, and/or a country.

The consumption of the vampiric power may continuously occur while the inductive charging unit is coupled to the alternating current power source, and it may occur over the course of an hour, a day, and/or over a longer time period. The consumption of the vampiric power may result in an unnecessary generation of power by a power plant. Carbon pollution, nuclear waste, or other forms of pollution and waste may occur as a result of the unnecessary generation of power. In addition, the consumption of the vampiric power may incur a power cost during a peak use period, which may waste a financial resource and/or contribute to causing an insufficient supply of power.

SUMMARY

Several methods and systems to perform automatic coupling of an alternating current power source and an inductive power apparatus to charge a target device battery are disclosed. In an aspect, an inductive battery charging system includes a connection module to determine when a target device is coupled to an inductive power apparatus. The system further includes a monitoring module to determine when a target device battery is below a charging threshold while using power from a supplemental power source. The system also includes an activation module to automatically couple the inductive power apparatus and an alternating current power source when a power level of the target device battery is below the charging threshold.

The system may include a separation module to automatically decouple the inductive power apparatus and the alternating current power source when a desired charging state of the target device battery is observed. The system may also include a transformer of the inductive power apparatus to inductively generate an electric current. The system may further include a rectification circuit of the inductive power apparatus and a voltage regulation circuit of the inductive power apparatus. The separation module may include an opto-coupled relay.

In the aspect, the opto-coupled relay of the separation module may be deactivated when the target device and the inductive power apparatus are decoupled. The system may further include a processor of the monitoring module coupled to the target device. The processor may be used to evaluate a target device battery power level with respect to the charging threshold. The system may also include a battery monitor coupled to the target device to determine the target device battery power level. The target device may include a mobile device.

In the aspect, the system may further include a sense feedback loop of the connection module to identify whether the target device is coupled with at least one of the inductive power apparatus and the alternating current power source. The system may also include an input buffer of the connection module to receive a feedback signal. In addition, the system may include an interrupt controller module to generate an interrupt signal determined by the feedback signal received by the input buffer. The system may also include an output buffer to generate an engage signal to control a coupling state of the inductive power apparatus and the alternating current power source. The system may further include a USB module to generate an engage signal to control a coupling state of the inductive power apparatus and the alternating current power source.

In addition, the connection module may determine whether the target device and the inductive power apparatus are coupled together by determining whether power is being provided to the target device by the inductive power apparatus. The supplemental power source may include one or more of a target device battery, a charger system battery, and an alternate inductive power apparatus. The system may further include a bypass module to initiate a charging sequence by electrically coupling the alternating current power source and the inductive power apparatus when a bypass input is detected.

In another aspect, an inductive battery charging method includes identifying whether a target device is coupled to a charging apparatus that includes an inductive power apparatus. The method further includes determining whether a power level of a target device battery is below a lower charging threshold while using power from a supplemental power source. The method also includes automatically engaging the inductive power apparatus and an alternating current power source when a lower available power threshold of a battery is reached. The method further includes automatically decoupling the inductive power apparatus and the alternating current power source when a desired threshold power level of the target device battery is reached. The inductive power apparatus includes one or more of a transformer to inductively generate an electric current, a rectification circuit, and a voltage regulation circuit. The method may include deactivating a solid state relay, such as an opto-coupled relay, of the inductive power apparatus when the target device and the inductive power apparatus are decoupled. In another aspect, an electromechanical relay may be used.

The power level of the target device battery may be determined using a processor and a battery monitor, and the target device may be a mobile device. The processor and the battery monitor may be physically coupled to the target device. The method may further include identifying a coupling of the inductive power apparatus and the target device using a sense feedback loop and receiving a feedback signal using an input buffer. The method may also include transmitting an interrupt signal determined in accordance with the feedback signal received by the input buffer. The method may further include adapting a coupling state of the inductive power apparatus and the alternating current power source based on the interrupt signal.

In yet another aspect, an inductive battery charging system includes a connection module to confirm whether a target device is coupled to a charging apparatus comprised of an inductive power apparatus. The inductive power apparatus includes a transformer and the target device includes a mobile device. The system also includes a sense feedback loop of the connection module to identify whether the target device is coupled to an alternating current power source using one or more of a sense feedback signal and a power transmitted from the alternating current power source to the target device.

In the aspect, the system also includes a monitoring module to detect whether a target device battery is below a charging threshold while using power from a supplemental power source. The system also includes a battery monitor coupled to the target device to determine a target device battery power level. The system further includes a processor of the monitoring module coupled to the target device. The processor is used to evaluate the target device battery power level with respect to the charging threshold. The system further includes an activation module to automatically couple the target device and the alternating current power source using the inductive power apparatus when the target device battery is below the charging threshold. The system also includes a separation module to automatically decouple the target device and the alternating current power source when a desired charging state of the target device battery is detected by the monitoring module. The separation module may include an opto-coupled relay or an electromechanical relay.

BRIEF DESCRIPTION OF THE VIEWS OF DRAWINGS

Example embodiments are illustrated by way of example and not limitation in the figures of the accompanying drawings, in which like references indicate similar elements and in which.

Other features of the present embodiments will be apparent from the accompanying Drawings and from the Detailed Description that follows.

DETAILED DESCRIPTION

Disclosed are systems and a method of automatic coupling of an alternating current power source and an inductive power apparatus to charge a target device battery. Although the embodiments have been described with reference to specific example embodiments, it will be evident that various modifications and changes may be made to these embodiments without departing from the broader spirit and scope of the various embodiments.

Figure 1:
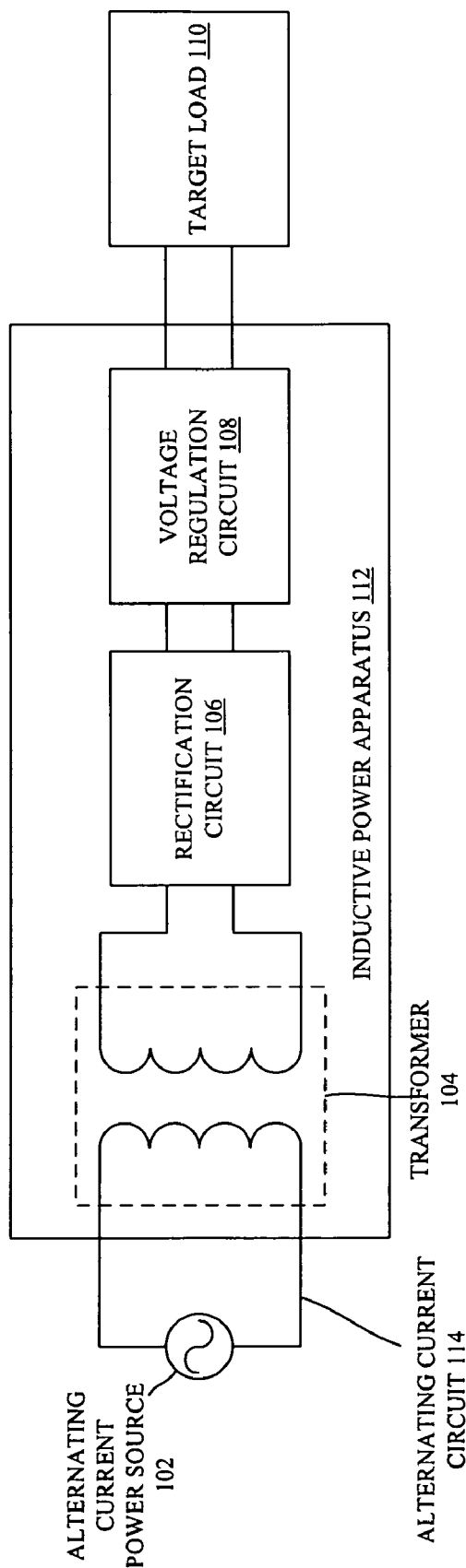
FIG. 1 is a schematic view of an inductive power apparatus, according to one embodiment.

FIG. 1 is a schematic view of an inductive power apparatus 112, according to one embodiment. In particular, FIG. 1 illustrates an alternating current power source 102, a transformer 104, a rectification circuit 106, a voltage regulation circuit 108, a target load 110, an inductive power apparatus 112, and an alternating current circuit 114.

In an embodiment, the alternating current power source 102 provides power to an inductive power apparatus 112 through a wall socket that is coupled to a power grid of an apparatus, a building, a city, and/or a larger power network. In the embodiment, the inductive power apparatus 112 includes a transformer 104, a rectification circuit 106, and a voltage regulation circuit 108. As illustrated in FIG. 1, the alternating current power source 102 may be coupled to the transformer 104 with an alternating current circuit 114. The transformer 104 may be coupled to the rectification circuit 106 and the voltage regulation circuit 108 in the inductive power apparatus 112. The inductive power apparatus 112 may further be coupled to the target load 110.

In the embodiment, the transformer 104 includes two conductively independent coils that are mutually coupled by magnetic flux when current flows in one of the coils. When alternating current flows in the primary coil a changing magnetic field may be produced within the transformer 104 core, which may then induce an electric current in the secondary coil as described by Faraday's law.

Vampire energy loss may occur when an electronic or mechanical machine consumes energy before or after the machine performs a useful task. Vampire energy loss may waste approximately 12% of the electric power production within the United States. One form of vampire energy loss may be "no load loss," in which energy may be lost even when the secondary coil of a transformer 104 is left open or is not attached to a load.

"No load loss" may be attributed to eddy currents and magnetic hysteresis within the transformer core. In addition, a direct current power supply may also incur dynamic and/or static power loss within a rectification circuit 106 and/or a voltage regulation circuit 108. These and other losses may contribute substantially to vampire energy loss. Another form of energy loss may include "parasitic loading," which may occur during a battery charging operation after a battery has been charged. "Parasitic loading" is further discussed with respect to FIG. 7.

In the embodiment, the target load 110 may be comprised of a battery, which may be one or more of various battery types. For example, the battery may be a wet cell or a dry cell battery. In addition, the battery may be one or more of a lead-acid battery, a nickel-cadmium battery, a nickel metal hydride battery, a lithium-ion cell, or any other type of rechargeable battery. The target load 110 may include a device and/or apparatus that may or may not include a battery, such as a laptop, a cell phone, a mobile device, etc.

Figure 2:
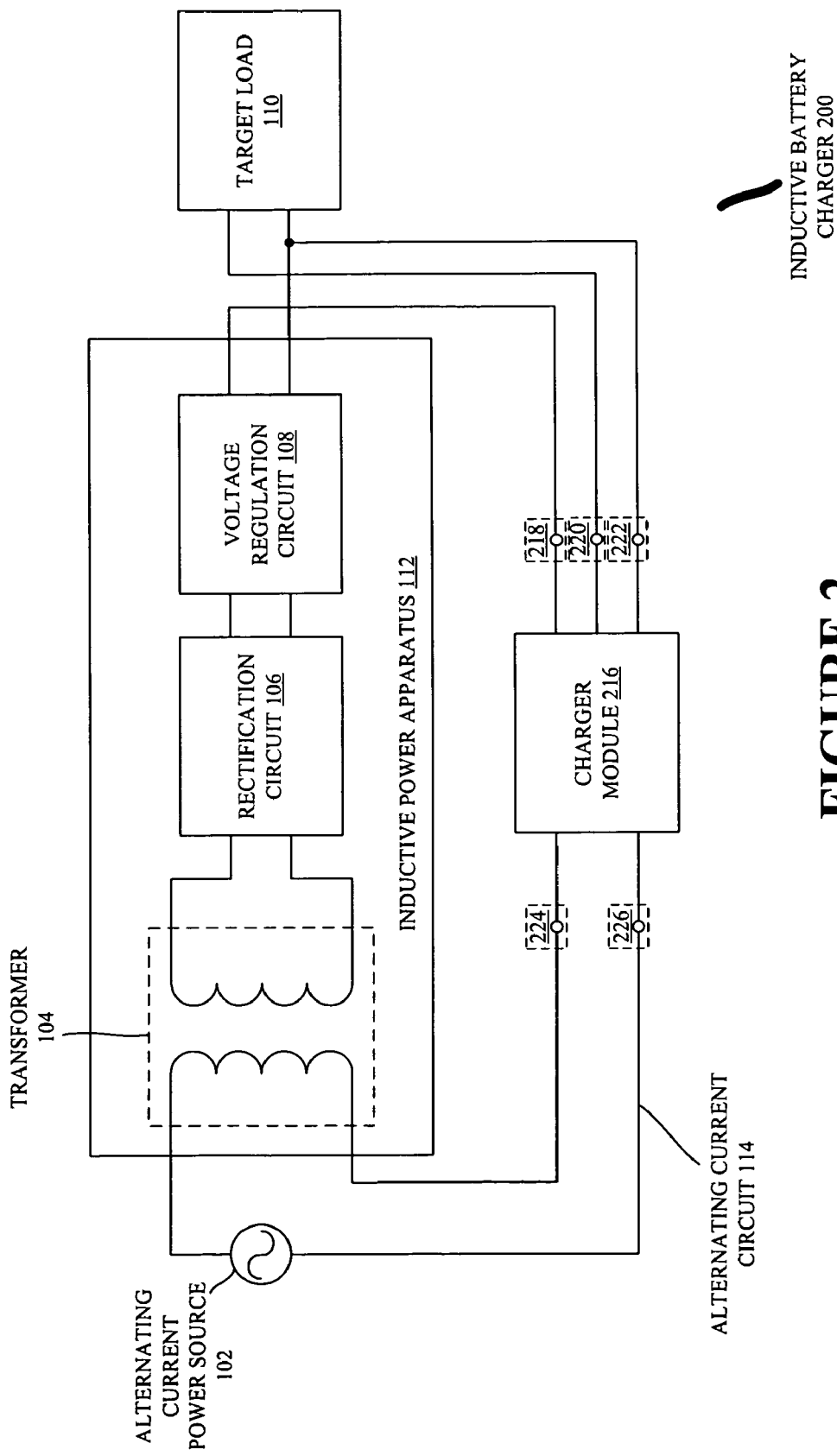
FIG. 2 is a schematic view of an inductive battery charger, according to one embodiment.

FIG. 2 is a schematic view of an inductive battery charger 200, according to one embodiment. In particular, FIG. 2 illustrates an alternating current power source 102, a transformer 104, a rectification circuit 106, a voltage regulation circuit 108, a target load 110, an inductive power apparatus 112, an alternating current circuit 114, an inductive battery charger 200, a charger module 216, and connections 218, 220, 222, 224, and 226.

As illustrated in FIG. 2, the charger module 216 may be coupled to the transformer 104 and the alternating current power source 102 through connections 224 and 226 in the alternating current circuit 114. The charger module 216 may be coupled to the voltage regulation circuit 108 and the target load 110 through connections 218, 220, and 222. In the present embodiment, the inductive battery charger 200 includes the inductive power apparatus 112 and the charger module 216.

Figure 7:
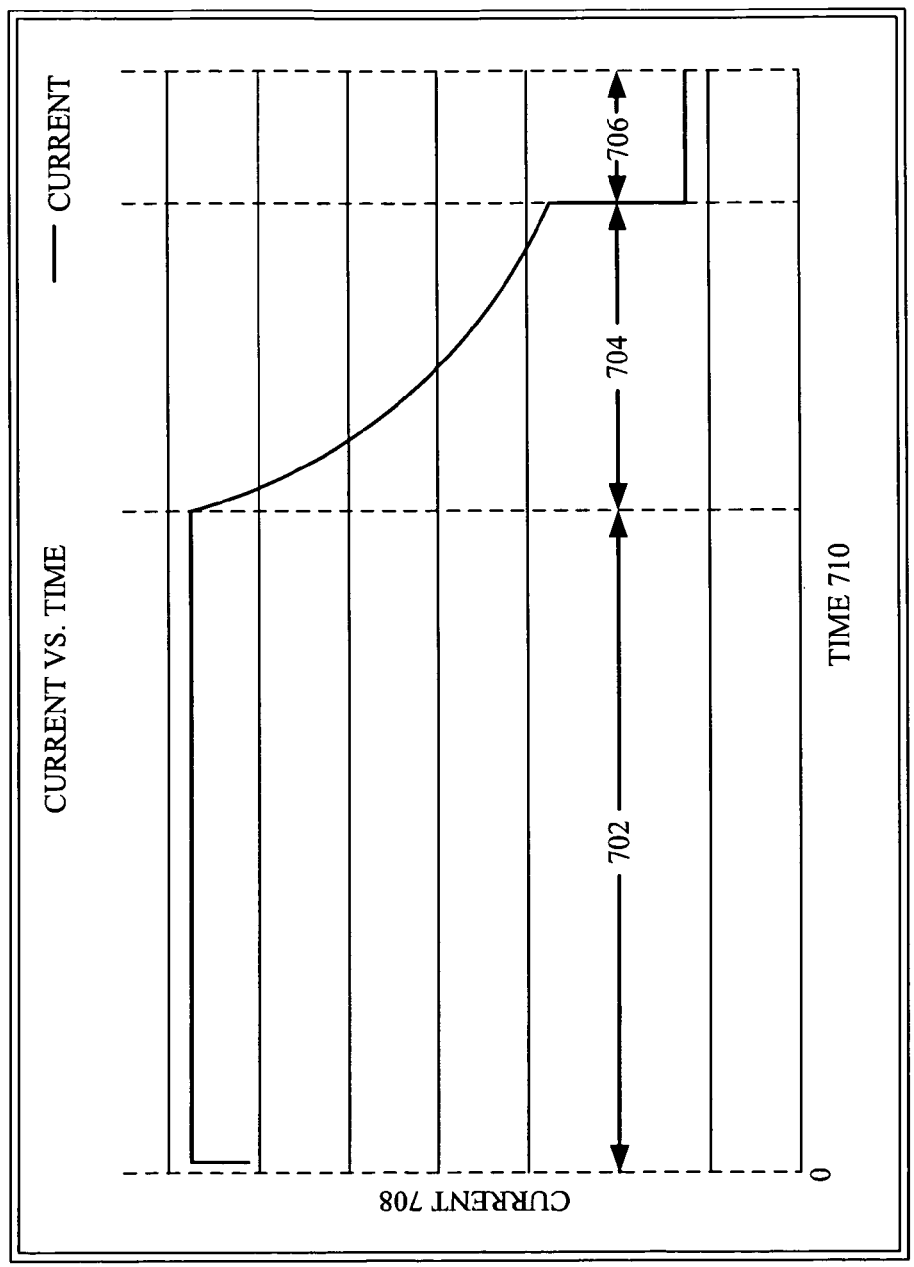
FIG. 7 is an illustration of a current draw characterization to charge a mobile device battery, according to one embodiment.

In one embodiment, the inductive battery charger 200 may operate in accordance with a power usage characteristic of a charging battery, which may be illustrated by the current vs. time plot of FIG. 7. The inductive battery charger 200 may cut alternating current power to the inductive power apparatus 112 once the charger module 216 determines that a battery of the target load 110 has been charged to a target threshold level. The charger module 216 may cut alternating current power when the determination occurs.

In the present embodiment, when the alternating current power is cut off from the inductive power apparatus 112, the charger module 216 may also undergo a "self disconnect" in which the charger module 216 may lack power from the inductive power apparatus 112. The charger module 216 may or may not include a charger module battery to allow the module to continue monitoring the target load after the "self disconnect" operation.

In the embodiment, when the alternating current power is cut off from the inductive power apparatus 112, a source of "no load loss" from the transformer 104 may be limited or prevented. In addition, cutting off the alternating current power may limit or prevent energy loss from static and/or dynamic power consumption of the rectification circuit 106 and/or the voltage regulation circuit 108.

In another embodiment, the charger module 216 may be modularly designed so that it may be integrated into future charger designs and/or adapted to an existing charger. For example, in FIG. 2, the charger module may be integrated with an existing design of an inductive power apparatus 112, according to the present embodiment.

Figure 6:
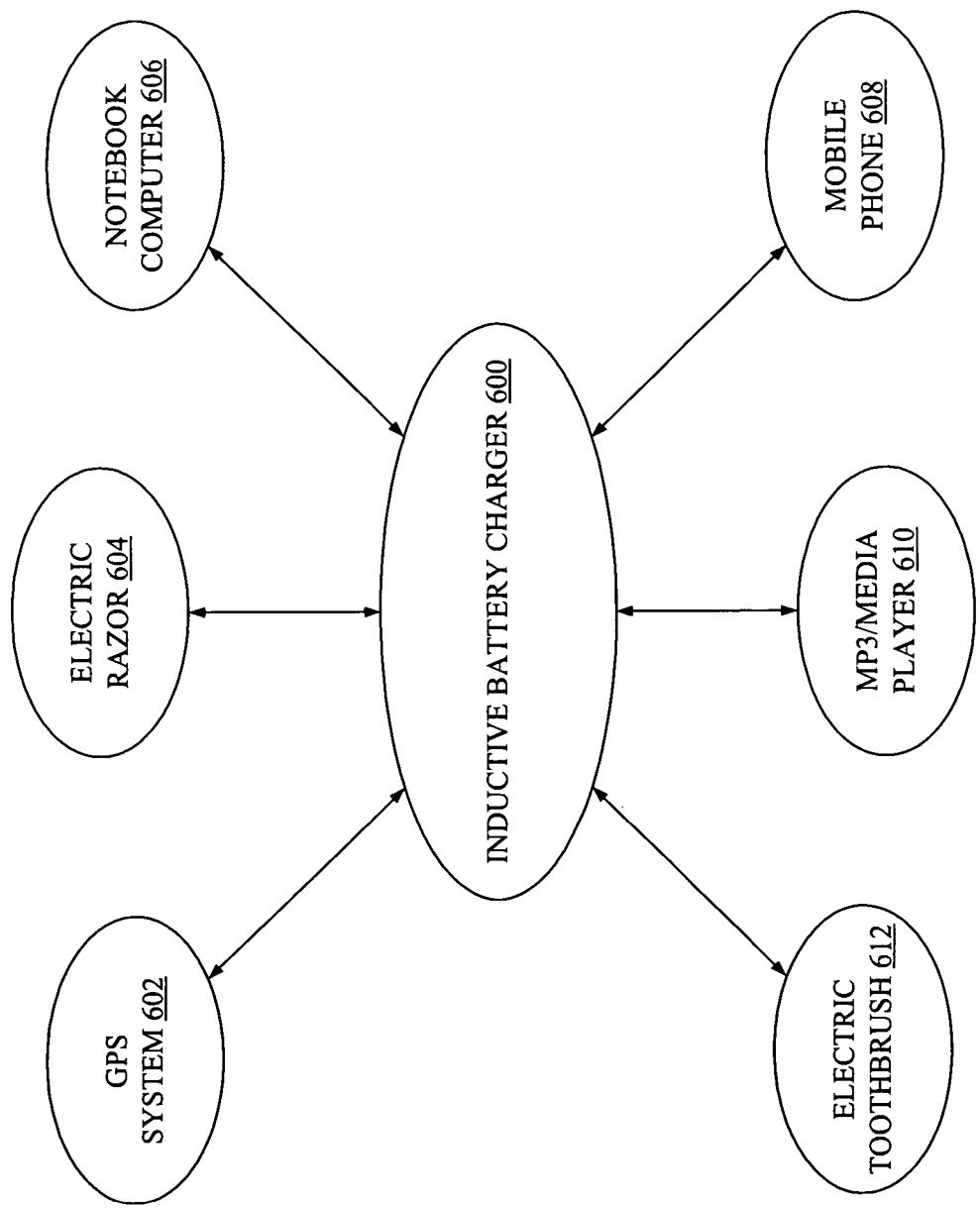
FIG. 6 is a system diagram of various devices that may be powered by the inductive battery charger, according to one embodiment.

In yet another embodiment, a charging operation to limit vampiric power consumption may begin when a target load 110 is coupled to the inductive battery charger 200 and the alternating current power source 102. A push button switch of the inductive battery charger 200 may be used to initiate a charging operation of the target load 110. In an embodiment, the charger module 216 then takes control of the inductive power apparatus 112. The charger module 216 then monitors the charge status of the battery. Based on the battery status, the charger module 216 determines whether to continue to allow alternating current power to be coupled to the inductive battery charger 200 components or to electrically disconnect the inductive battery charger 200 from the alternating current power source 102. The inductive battery charger 200 may be electrically disconnected from the alternating current power source 102 once the battery is charged to a desired target level. In other embodiments, the charger module 216 is made up of analog control circuits, which may be better understood from FIGS. 3 and 4. In multiple embodiments, the inductive battery charger 216 may be used to power a variety of portable devices, mobile devices, and other electrically powered devices or systems. Some example devices are illustrated in FIG. 6.

Figure 3:
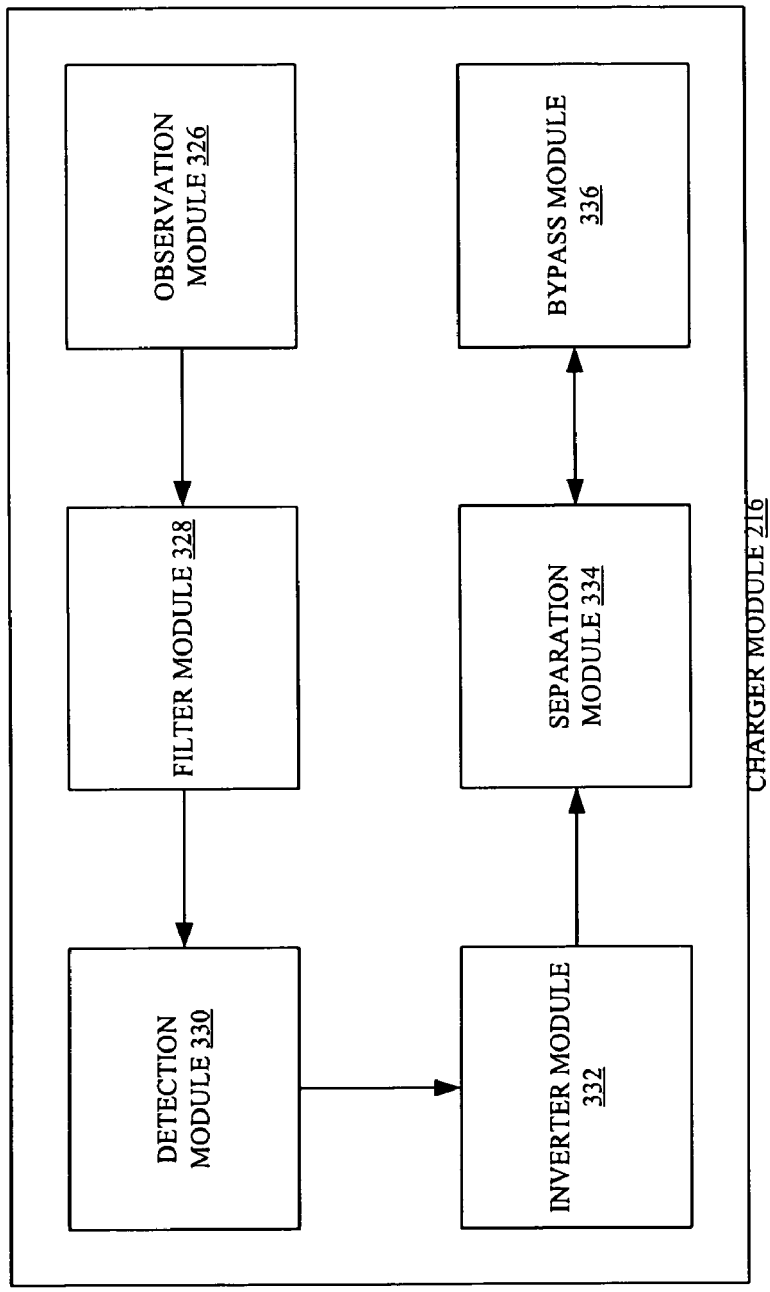
FIG. 3 is an exploded view of a charger module, according to one embodiment.

FIG. 3 is an exploded view of a charger module 216, according to one embodiment. In particular, FIG. 3 illustrates an observation module 326, a filter module 328, a detection module 330, an inverter module 332, a separation module 334, and a bypass module 336. In an embodiment, the modules may be circuits, including an observation circuit, a filter circuit, a detection circuit, an inverter circuit, a separation circuit, and/or a bypass circuit.

In one embodiment, the inductive power apparatus 112 provides direct current power to a target load 110 when the inductive power apparatus 112 is coupled to the alternating current power source 102. In the present embodiment, the observation module 326 determines a power consumption associated with the target load 110, and the detection module 330 determines when power consumption reaches a threshold level. The separation module 334 decouples the inductive power apparatus 112 and the alternating current power source 102 when the power consumption is lower than a threshold level to limit vampiric power consumption of the inductive power apparatus 112.

Figure 4:
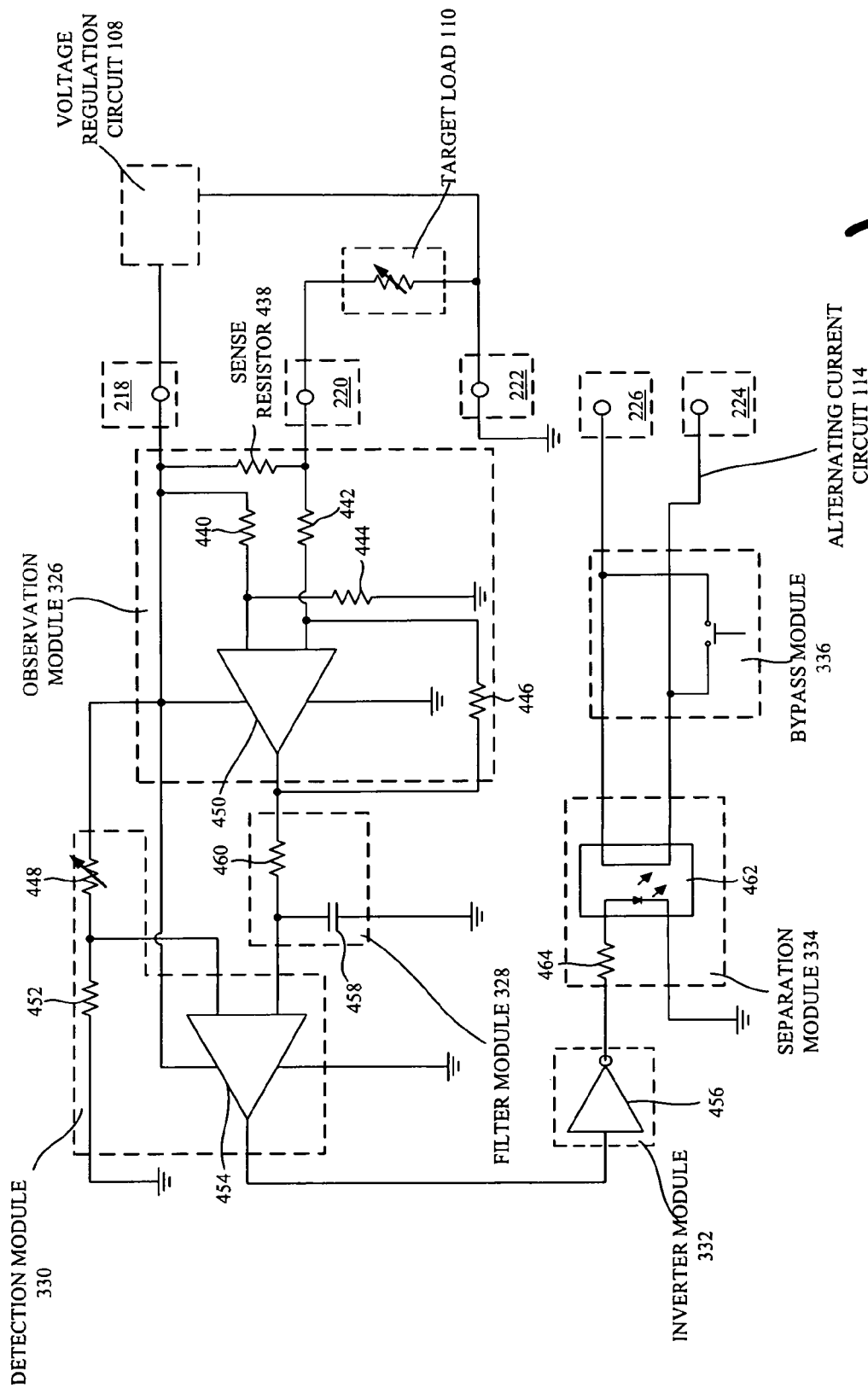
FIG. 4 is an exploded schematic view illustrating the charger module, according to one embodiment.

FIG. 4 is an exploded schematic view illustrating the charger module 216, according to one embodiment. In particular, FIG. 4 illustrates a voltage regulation circuit 108, a target load 110, an alternating current circuit 114, connections 216, 218, 220, 222, 224, an observation circuit 326, a filter circuit 328, a detection circuit 330, an inverter circuit 332, a separation circuit 334, a bypass circuit 336, according to the embodiment. The embodiment further includes a charger module 416, a sense resistor 438, resistors 440, 442, 444, and 446. The charger module 416 may use analog circuits rather than software that operate using a processor 1302 and a memory (e.g., a main memory 1304, a static memory 1306). In other embodiments, the components of the charger module 416 may include circuit elements and/or software elements.

In an embodiment, the observation module 326 includes a differential amplifier, which uses an operational amplifier 450 with a particular arrangement of resistors 440, 442, 444, and 446. The differential amplifier senses and amplifies the voltage difference across a sense resistor 438, which is placed in series with the target load 110 that can be electrically modeled as a varying resistor, according to the embodiment.

In an embodiment, based on one or more charging characterization experiments of a cell phone and various mobile devices, the current drawn while the target battery is being charged will vary in accordance with the state of the battery charge. For example, in an embodiment, the current drawn will remain approximately constant at the maximum level for a period of time before decaying. The current draw decay may occur linearly or nonlinearly, such as by decaying exponentially. The charging operation may be better understood from FIG. 7.

In the embodiment, as the target battery becomes charged, a sudden drop in the current drawn by the target battery may occur. The amplified output of the differential amplifier of the observation module 326 is fed into a filter module 328, which may include a low pass filter. The low pass filter may be composed of resistor 460 and capacitor 458.

In the present embodiment, the output signal of the filter module 328 is fed to an analog comparator circuit of a detection module 330. The analog comparator circuit may be composed of an additional operational amplifier 454, and resistors 452 and 448. Resistors 452 and 448 are arranged as a voltage divider with an output value that dictates the comparator's voltage threshold and is fed into a non-inverting input of the additional operational amplifier 454.

In the embodiment, the low pass filter of the filter module 328 conditions the signal between the differential amplifier of the observation module 326 and the comparator circuit of a detection module 330 to prevent a high frequency noise from prematurely crossing the voltage threshold of the analog comparator. The high frequency noise may otherwise generate a voltage level associated with a completed charging operation based on signal fluctuation. In other embodiments, circuitry and/or software may be used to determine whether a target voltage threshold has been crossed for a sufficient period of time to indicate that a sufficient charging level has been reached. For instance, a timing circuit and/or software instruction may delay or prevent transmission of a voltage to the comparator circuit that would cause the comparator circuit to change its output voltage before the target load 110 reaches its desired charging state.

In the embodiment, the output of the comparator circuit of the detection module 330 is fed into an inverter of the inverter module 332. The inverter module 332 outputs a high voltage signal, which provides an operational current (e.g., "on current") to an internal LED of the opto-coupled relay 462 of the separation module 334 when the output of the voltage comparator of the detection module 330 is low.

In the embodiment, a current limiting resistor 464 is placed in series with the output of the inverter module 332 and the input of the opto-coupled relay 462 of the separation module 334 to keep the current level from exceeding the maximum current value of the relay's internal LED. When the output voltage of the low pass filter of the filter module 328 crosses the threshold of the comparator of the detection module 330, its output changes from low to high. The output is inverted by the inverter module 332 to provide a low voltage to the opto-coupled relay 462 of the separation module 334. The low voltage signal may provide an approximately zero voltage potential difference across the internal LED of the opto-coupled relay 462 of the separation module 334. The approximately zero voltage potential difference, which stops the necessary "on current" for closed switch operation of the opto coupled relay's 462 alternating current ports 208 and 210. The operation may be better understood by referring to FIG. 8.

In an additional embodiment, a bypass module 336 is used to provide an initial power to the charger module 216. The bypass module 336 may include a push button switch 502, which may be used to provide initial power to the charger module 216. The push button switch 502 once pressed bypasses the opto-coupled relay 462 and provides direct alternating current to the components of the inductive power apparatus, including the transformer 104, the rectification circuit 106, and the voltage regulation circuit 108. Providing direct alternating current to these components may provide power to the charger module 216, which may then provide the "on current" to the opto-coupled relay 462 of the separation module 334. Power may be provided to the separation module 334 within approximately several milliseconds of the pressing of the push button of the bypass module 336.

In an embodiment, when the opto-coupled relay 462 of the separation module 334 lacks the "on current," the connection between the alternating current power source 102 from the wall receptacle and the primary coil of the transformer 104 is electrically open. In the embodiment, the "on current" to the opto-coupled relay 462 couples the connections 208 and 210 on the charger module, allows alternating current power to be provided to the transformer 104. The AC source will remain open until the push button switch 502 is pressed again as described in 806 for the next charging session.

In another embodiment, the output of the voltage divider of the observation module 326 is set by adjusting the variable resistor 448. The voltage divider is composed of resistors 452 and 448. This output sets the voltage threshold of the analog comparator of the detection module 330, and the output may be set to an amplified voltage level that is approximately equal to the lower current demand that is consistent with a charged battery. The operation of the charging operation may be better understood by referring to FIG. 7. The voltage cutoff threshold may be set to a level below a voltage associated with a charged battery, which may be below the lowest current level illustrated in FIG. 7.

Figure 5:
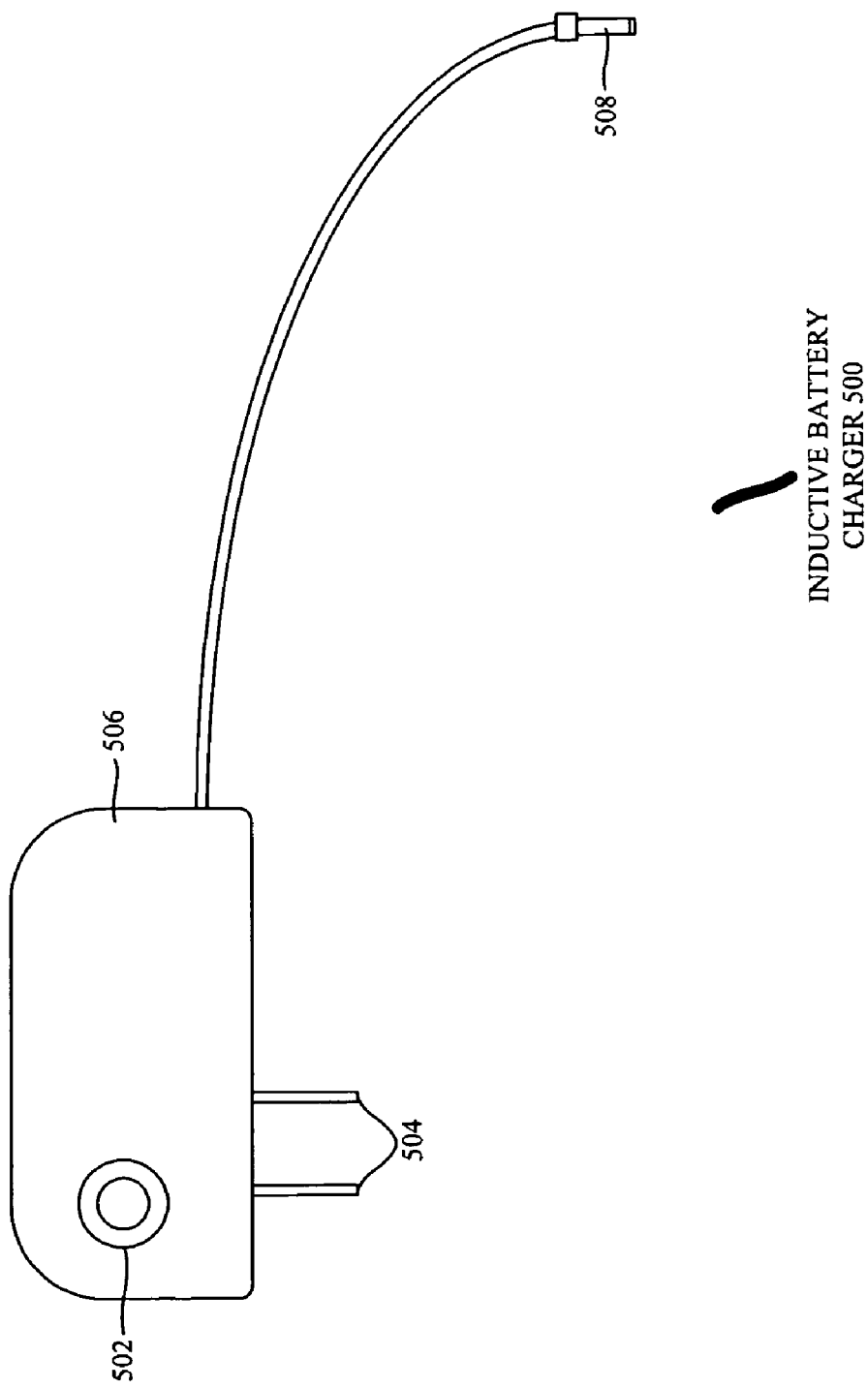
FIG. 5 is an illustration of an inductive battery charger, according to one embodiment.

FIG. 5 is an illustration of an inductive battery charger 500, according to one embodiment. In particular, FIG. 5 illustrates a push button switch 502, wall receptacle prongs 504, a charger enclosure 506, and a two port power and ground connector 508. Integration of the charger module 216 with an inductive power apparatus 112 may be internal to the charger enclosure 506. The alternating current power source 102 may be coupled to the inductive battery charger 500.

FIG. 6 is a system diagram of various devices that may be powered by the inductive battery charger, according to one embodiment. In particular, FIG. 6 illustrates an inductive battery charger 600, a GPS system 602, an electric razor 604, a notebook computer 606, a mobile phone 608, an MP3/media player 610, and an electric toothbrush 612, according to one or more embodiments. The inductive battery charger 600 may include the same embodiments as the inductive battery charger 200 and 500. Each of the illustrated devices may include a battery that can be coupled to the inductive battery charger 600. Once a target battery coupled to the inductive battery charger 600 has been determined to have been charged, the inductive battery charger 600 may disconnect the alternating current power source 102 of the target device to limit vampiric energy loss associated with the inductive power apparatus 112.

FIG. 7 is an illustration of a current draw characterization to charge a mobile device battery, according to one embodiment. According to an embodiment, FIG. 7 shows the magnitude of the current drawn by the target load 110 over time through different states of charging and/or other electrical operation. In the present embodiment, the current drawn from the target load 110 (e.g., a battery) will be approximately constant at a maximum current draw, as illustrated in region 702 of FIG. 7. The current draw then decays exponentially as shown in region 704. In region 706, there may be a sudden current drop as the target load 110 becomes charged, and a residual parasitic current draw may occur in region 706.

In an embodiment, the inductive battery charger 200 may self-disconnect after the device battery has been charged and before a parasitic load can draw power. In the embodiment, by setting a cut off voltage threshold to a level below the current draw level for a charging battery of region 704 and above the parasitic current draw level of region 706, the inductive battery charger 200 may limit a loss of power due to the parasitic current draw while achieving a desired charging level of the target load 110.

In another embodiment, the current draw for a charging battery may be experimentally determined and used to adjust the comparator circuit of the detection module 330.

Figure 8:
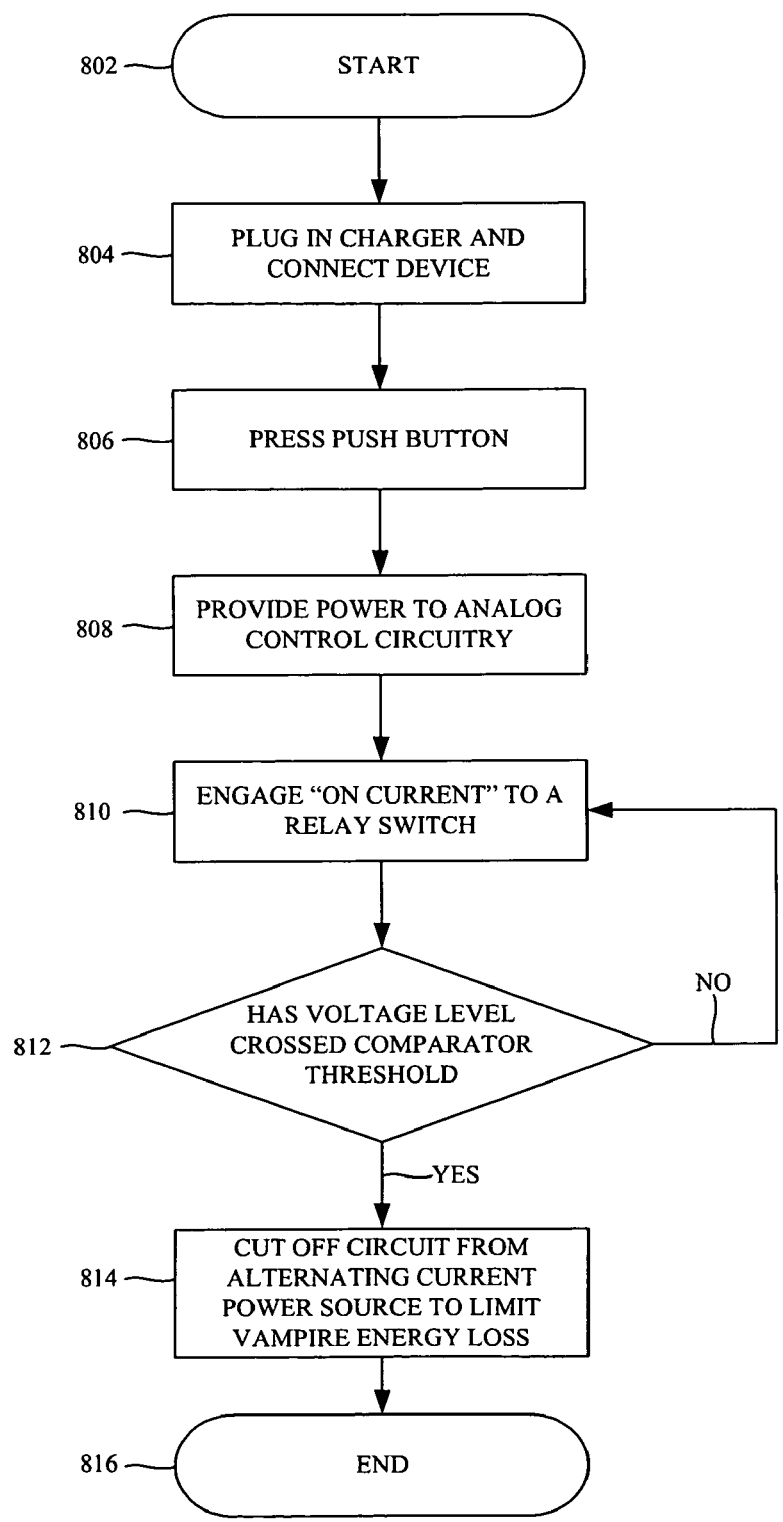
FIG. 8 is a flow chart that depicts operation of an inductive battery charger, according to one embodiment.

FIG. 8 is a flow chart that depicts operation of an inductive battery charger 200, according to one embodiment. In operation 802, a charging operation starts. In operation 804, a charger is plugged in to a socket coupled to an alternating current power source 102. In operation 806, a mechanical interface that includes a push button is compressed. In operation 808, power is provided to analog control circuitry of the charger module 216. In operation 810, an "on current" is engaged to a separation module 334 that includes a relay switch. In operation 812, the voltage is compared with the voltage level. If the voltage has not crossed the comparator threshold, the "on current" continues to be engaged. If the voltage level has crossed the comparator threshold, in operation 814, the circuit is cut off from an alternating current power source 102 to limit vampiric energy loss. In operation 816, the process ends.

Figure 9:
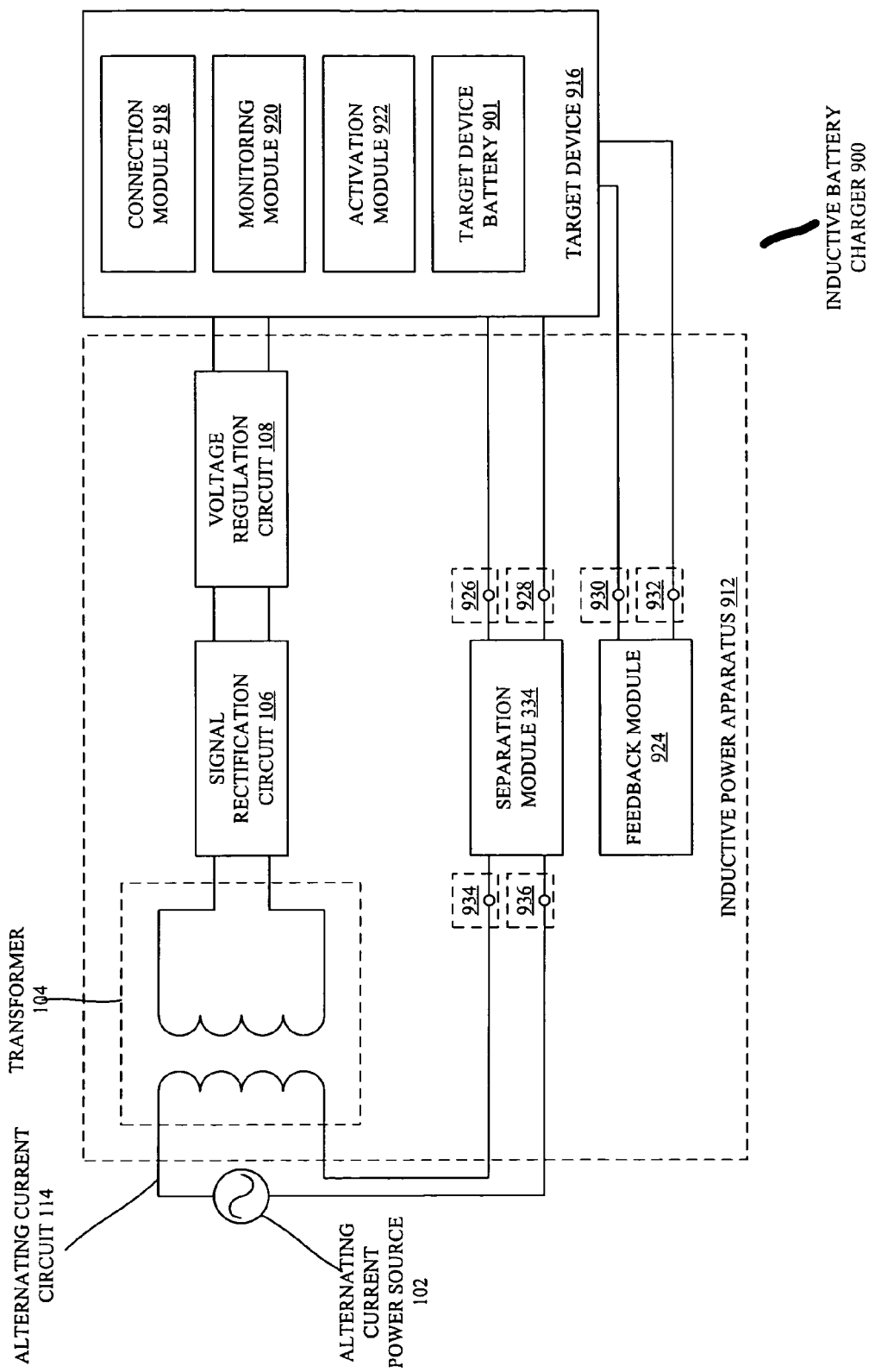
FIG. 9 is a schematic view of an inductive power apparatus coupled to a target device, according to one embodiment.

FIG. 9 is a schematic view of an inductive power apparatus 912 coupled to a target device 916, according to one embodiment. In particular, FIG. 9 illustrates an alternating current power source 102, a transformer 104, a signal rectification circuit 106, a voltage regulation circuit 108, an alternating current circuit 114, a separation module 334, an inductive battery charger 900, a target device battery 901, an inductive power apparatus 912, a target device 916, a connection module 918, a monitoring module 920, an activation module 922, a feedback module 924, and connections 926, 928, 930, 932, 934, and 936.

In an embodiment, the inductive battery charger 900 apparatus includes the inductive power apparatus 912 and the target device 916. The inductive power apparatus 912 includes the transformer 104, the signal rectification circuit 106, and the voltage regulation circuit 108. The inductive power apparatus 912 also includes the separation module 334 and the feedback module 924. The target device 916 includes the connection module 918, the monitoring module 920, the activation module 922, and the target device battery 901.

In the embodiment, the voltage regulation circuit 108 is coupled to the target device 916. The target device 916 is coupled to the separation module 334 with connections 926 and 928. The target device 916 is coupled to the feedback module 924 with connections 930 and 932. The feedback module 924 is coupled to the target device 916 with connections 934 and 936. In an alternate embodiment, the inductive power apparatus 912 and the target device 916 may operate without the feedback module 924 and connections 930 and 932.

Figure 10:
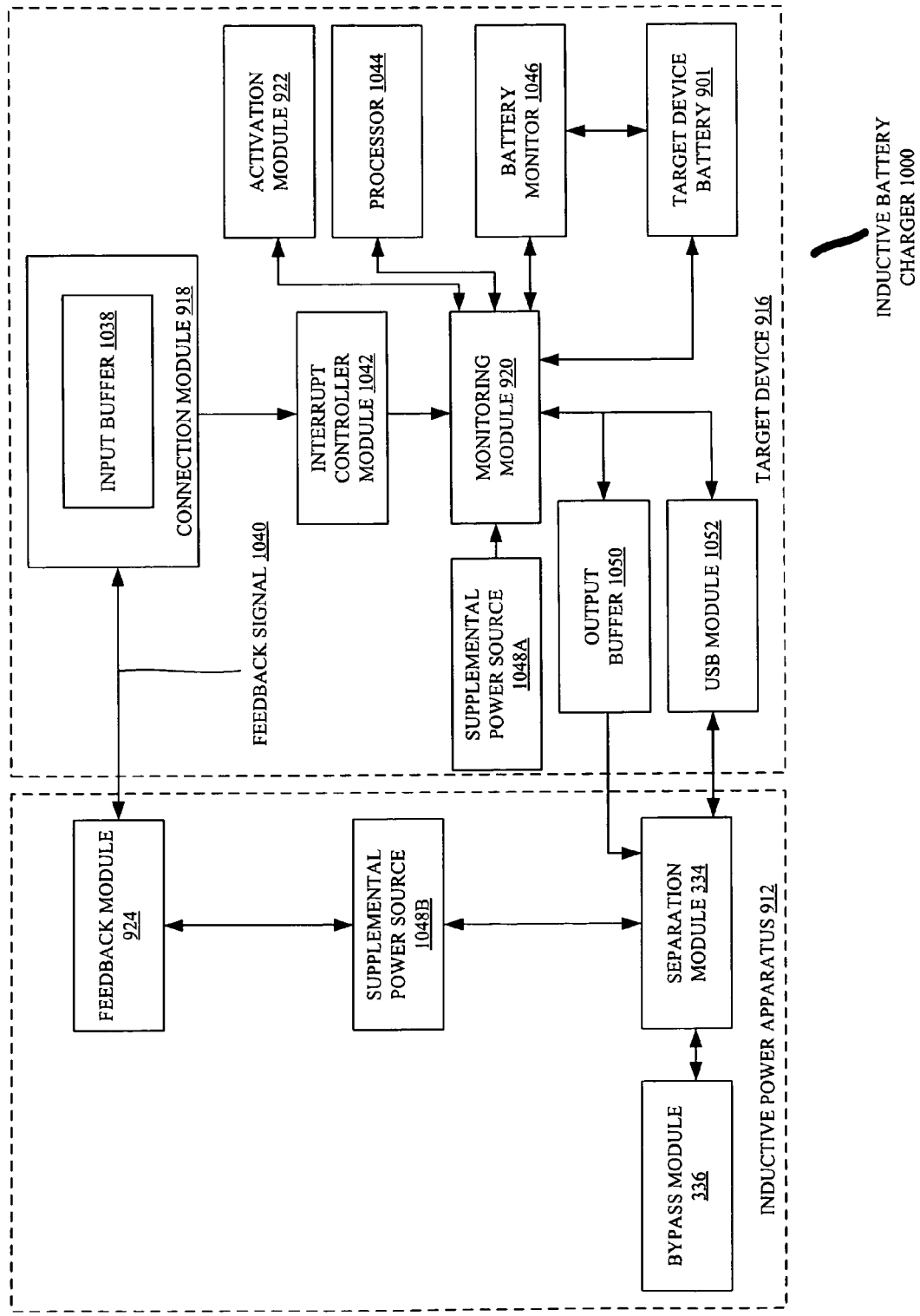
FIG. 10 is an exploded view of an inductive power apparatus and a target device, according to one embodiment.

FIG. 10 is an exploded view of the inductive power apparatus 912 and the target device 916, according to one embodiment. In particular, FIG. 10 illustrates a separation module 334, a bypass module 336, a target device battery 901, the inductive power apparatus 912, the target device 916, a connection module 918, a monitoring module 920, an activation module 922, a feedback module 924, an inductive battery charger 1000, an input buffer 1038, a feedback signal 1040, an interrupt controller module 1042, a processor 1044, a battery monitor 1046, a supplemental power source 1048A-B, an output buffer 1050, and a USB module 1052.

In an embodiment, the inductive battery charger 1000 apparatus includes the inductive power apparatus 912 and the target device 916. The connection module 918 includes the input buffer 1038. The connection module 918 is coupled to the feedback module 924, and the feedback signal 1040 is communicated between the connection module 918 and the feedback module 924. The connection module 918 is coupled to the interrupt controller module 1042, which is coupled to the monitoring module 920. In the embodiment, the monitoring module 920 is coupled to the activation module 922, the processor 1044, the battery monitor 1046, the target device battery 901, the supplemental power source 1048A, the output buffer 1050, and the USB module 1052. The output buffer 1050 and the USB module 1052 are coupled to the separation module 334. In the embodiment, the separation module 334 is coupled to the bypass module 336 and the supplemental power source 1048B. The supplemental power source 1048B is coupled to the feedback module 924.

In an embodiment, the inductive battery charger 900 includes a connection module 918 to determine when a target device 916 is coupled to an inductive power apparatus 912. The system includes a monitoring module 920 to determine when a target device battery 901 (e.g., a supplemental power source 1048A-B) is below a charging threshold while using power from a supplemental power source 1048A-B (e.g., the target device battery 901, a charger battery, a capacitor, an alternate inductive power apparatus, etc.). The system also includes an activation module 922 to automatically couple an inductive power apparatus 912 and an alternating current power source 102 when a power level of the target device battery 901 is below the charging threshold.

In an embodiment, a separation module 334 may automatically decouple the inductive power apparatus and the alternating current power source when a desired charging state of the target device battery 901 is observed. The separation module 334 may automatically decouple the inductive power apparatus 112 and the alternating current power source 102 when the "on current" to the opto-coupled relay 462 of the separation module 334 is disabled, which may cause the opto-coupled relay to open the alternating current circuit 114.

In the embodiment, the desired charging state may be identified by a change in a charging characteristic, such as a drop in charging current below a threshold level. The inductive power apparatus 912 may include a transformer 104 to inductively generate an electric current, a rectification circuit 106 of the inductive power apparatus 112, and/or a voltage regulation circuit. The separation module 334 may include an opto-coupled relay 462. The opto-coupled relay 462 of the separation module 334 may be deactivated when the target device 916 and the inductive power apparatus 912 are decoupled to further reduce power consumption when charging is not occurring.

In an embodiment, a processor 1044 and a battery monitor 1046 of the monitoring module 920 are coupled to the target device 916 to evaluate a target device battery 901 power level with respect to the charging threshold and to determine the target device battery 901 power level. The target device 916 may be a mobile device, such as a mobile phone 608 or a notebook computer 606.

In another embodiment, a sense feedback loop 1154 of the connection module 918 may be used to identify whether the target device 916 is coupled with at least one of the inductive power apparatus 912 and the alternating current power source 102. An input buffer 1038 of the connection module 918 may receive a feedback signal 1040. In addition, the system may include an interrupt controller module 1042 to generate an interrupt signal determined by the feedback signal 1040 received by the input buffer 1038. The system may also include an output buffer 1050 to generate an engage signal to control a coupling state of the inductive power apparatus 912 and the alternating current power source 102. The system may further include a USB module 1052 to generate an engage signal to control a coupling state of the inductive power apparatus 912 and the alternating current power source 102. The engage signal may be an "on current" provided to or withheld from the opto-coupled relay 462 of the separation module 334 to open or close the alternating current circuit 114.

In an embodiment, the connection module 918 may determine whether the target device 916 and the inductive power apparatus 912 are coupled together by determining whether power is being provided to the target device 916 by the inductive power apparatus 912. The supplemental power source 1048A-B may include one or more of a target device battery 901, a charger system battery, and an alternate inductive power apparatus. A bypass module 336 may initiate a charging sequence by electrically coupling the alternating current power source 102 and the inductive power apparatus 912 when a bypass input is detected.

Figure 11:
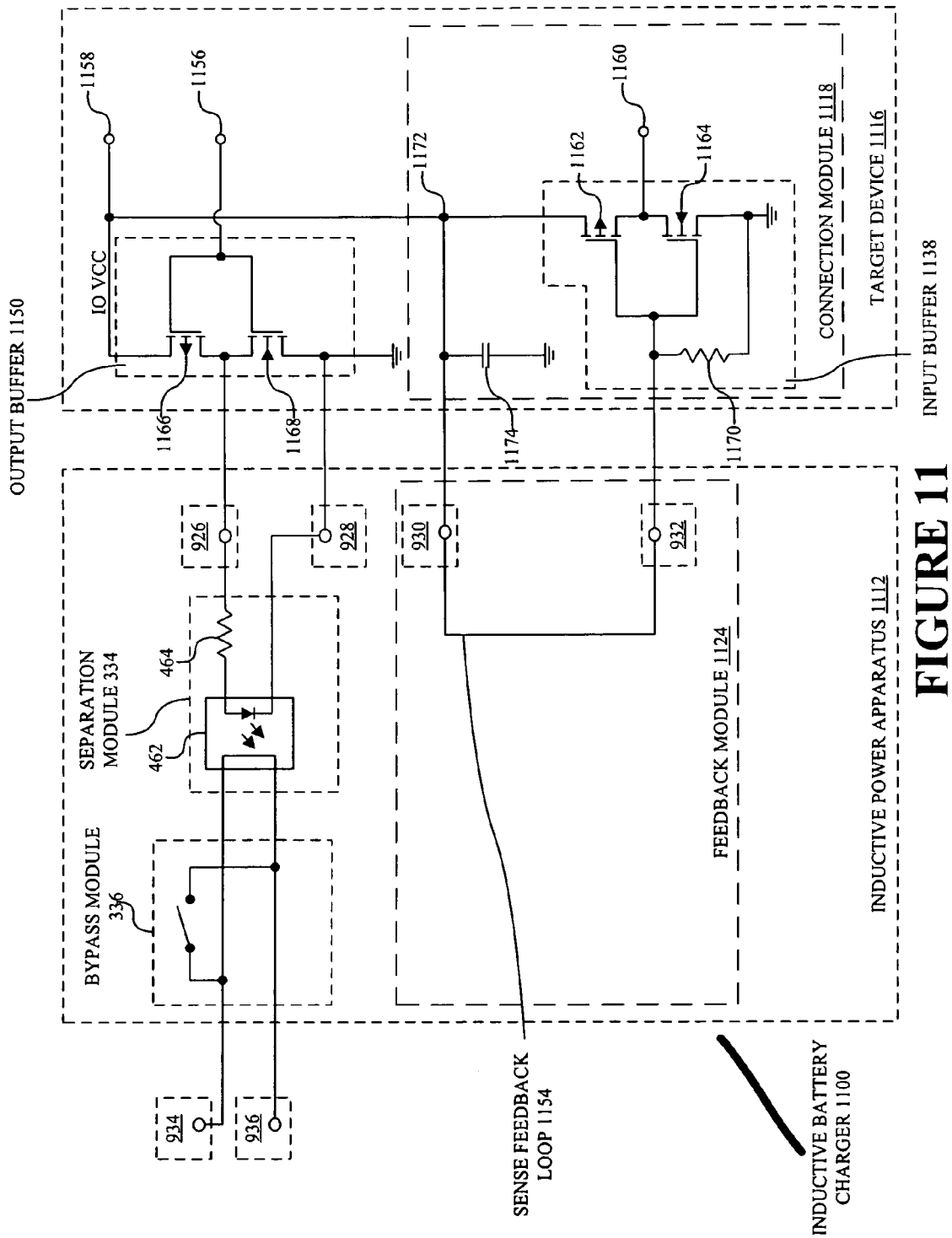
FIG. 11 is an exploded schematic view illustrating components of the inductive power apparatus and the target device, according to one embodiment.

FIG. 11 is an exploded schematic view illustrating components of the inductive power apparatus 1112 and the target device 1116, according to one embodiment. In particular, FIG. 11 illustrates a separation module 334, a bypass module 336, a resistor 438, an opto-coupled relay 462, a resistor 464, connections 926, 928, 930, 932, 934, 936, an inductive battery charger 1100, an inductive power apparatus 1112, target device 1116, connection module 1118, feedback module 1124, input buffer 1138, output buffer 1150, sense feedback loop 1154, nodes 1156, 1158, 1160, pFET 1162, nFET 1164, pFET 1166, nFET 1168, resistor 1170, node 1172, and capacitor 1174.

In the embodiment, the inductive battery charger 1100 includes the inductive power apparatus 1112 and the target device 1116. The output buffer 1150 includes pFET 1166 and nFET 1168, and the separation module 334 includes opto-coupled relay 462 and resistor 464. The connection module 1118 includes the input buffer 1138, node 1172 and capacitor 1174. Input buffer 1138 includes pFET 1162, nFET 1164, and resistor 1170. In addition, in the embodiment, feedback module 1124 includes sense feedback loop 1154.

In an embodiment, the inductive charger apparatus 1100 may use a feedback signal 1040 communicated between the connection module 1118 and the feedback module 1124 using the sense feedback loop 1154 and the input buffer 1138. The feedback may occur when the target device 1116 is coupled to the inductive power apparatus 1112, and it may provide a detection mechanism for the control mechanism described in greater detail with respect to FIG. 14.

In the embodiment, a logic state change on the input buffer 1138 will trigger an interrupt by the interrupt controller module 1042 to initiate an Interrupt Service Routine (ISR) by the processor 1044. Based on the strength of the battery reported by the battery monitor 1046, the control algorithm as described in FIG. 14 will make the decision to provide the "on current" to the separation module 334 on the inductive power apparatus 1112 via the output buffer 1150.

In the embodiment, a voltage source signal of the connection module 1118 is connected by node 1172 to the IO supply 1158 of the system on a chip (SoC). A ground connected decoupling capacitor 1174 is placed in parallel to the IO supply 1158 to reduce noise. The voltage source signal 302 is coupled to node 930 and is connected to node 932 via the sense feedback loop 1154 which electrically shorts the two nodes 930 and 932 together as illustrated in FIG. 11. The sense feedback loop 1154, connection module 1118, and feedback module 1124 serve as the coupling detection mechanism of the target device 1116.

In various embodiments, General Purpose Input Output (GPIO) hardware is used for the output buffer 1150 and input buffer 1138. In an embodiment as illustrated in FIG. 11, the output buffer 1150 is the last stage of a MOSFET inverter chain of SoC IO signals, and is composed of pFET 1166 and nFET 1168. In the embodiment, input buffer 1138 is the first stage of the input inverter chain and is composed of pFET 1162 and nFET 1164. The logical equivalent of the input voltage present at node 932 is mapped to an internal register address that can be accessed by the processor 1044 of the SoC. When the voltage state of node 932 is changed, for example, when the inductive charger apparatus 1112 is connected or disconnected from the target device 916, the interrupt controller module 1042 will trigger an ISR for the processor 1044 to service. In the embodiment, a pull down resistor 1170 is used to keep the input port from "floating" while disconnected from the charger. When the control algorithm determines that the battery needs charging, the processor 1044 will write a logic 1 to the register address that maps to the GPIO output buffer 1150, which is the last stage of the inverter chain with an output value that is the inverted value of node 1156. The GPIO port employed as output buffer 1150 should be capable of providing the necessary "on current" to the separation module 334, which may include an opto-coupled relay 462 and a current limiting resistor 464.

Figure 12:
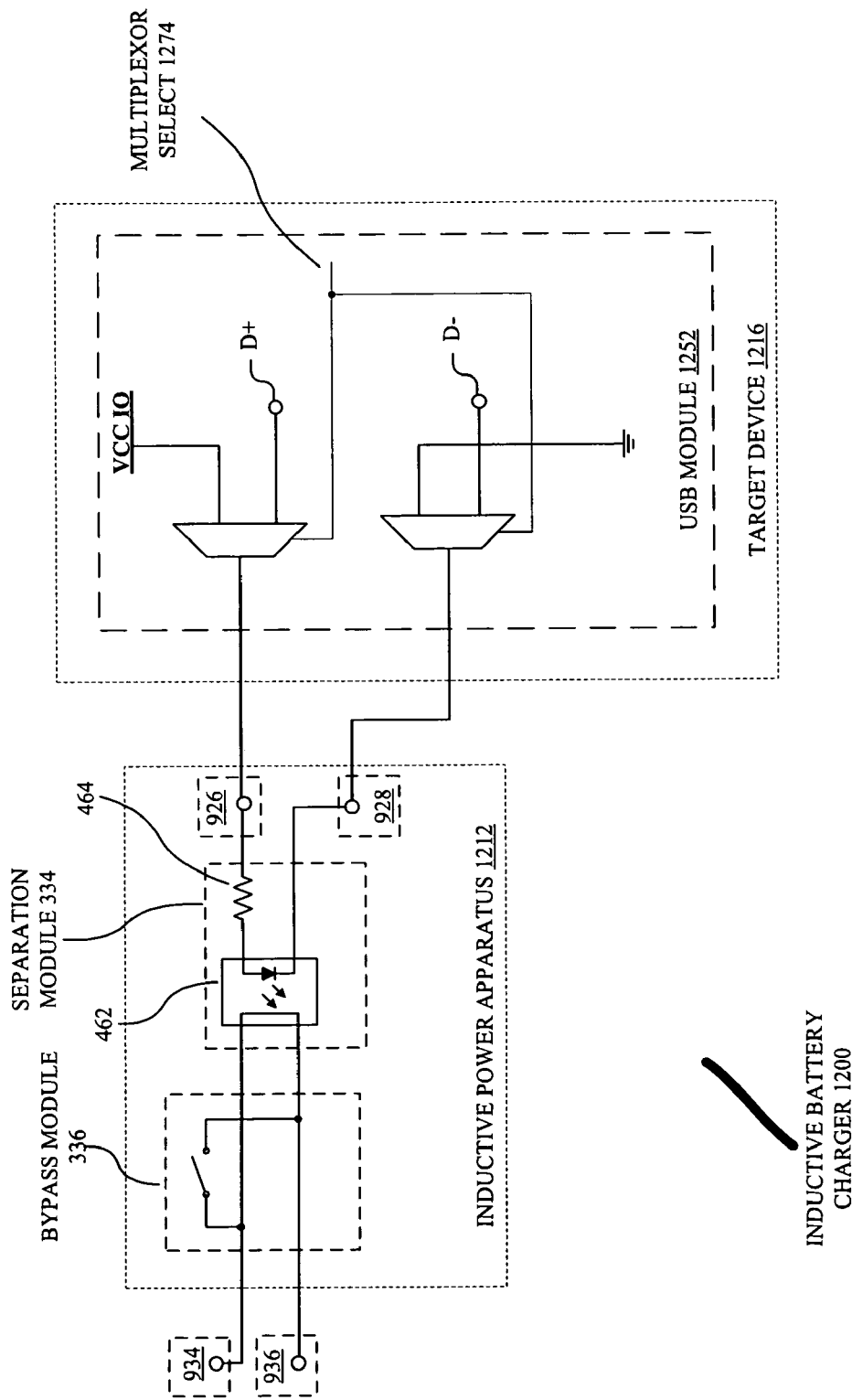
FIG. 12 is an exploded schematic view illustrating components of the inductive power apparatus and the target device, according to an additional embodiment.

FIG. 12 is an exploded schematic view illustrating components of the inductive power apparatus and the target device, according to an additional embodiment. In particular, FIG. 12 illustrates separation module 334, bypass module 336, opto-coupled relay 462, resistor 464, connections 926, 928, 934, 936, an inductive battery charger 1200, an inductive power apparatus 1212, a target device 1216, a USB module 1252, and a multiplexor select 1274.

In an embodiment, the inductive battery charger 1200 includes the inductive power apparatus 1212 and the target device 1216. The inductive power apparatus 1212 includes the separation module 334 and the bypass module 336. The separation module 334 includes the opto-coupled relay 462 and the resistor 464. The target device 1216 includes the USB module 1252, which includes the multiplexor select 1274 node.

FIG. 12 illustrates an alternate embodiment of the inductive charger apparatus 1200 that uses a USB interface to couple the inductive power apparatus 1212 and the target device 1216. A USB interface may be used as a battery charge port on a cell phone or other mobile device. The USB specification applicable to the embodiments described may include a power, a ground, a D+, and a D− signal.

In an embodiment, the USB power signal may be coupled to the power signal of the inductive charger apparatus 1200, and the USB ground signal may be coupled to the ground signal of the inductive charger apparatus 1200. Data signals D+ and D− may be coupled to connections 926 and 928 to provide control signals to the separation module 334 and the opto-coupled relay 462.

In the embodiment, mechanisms other than connections 930 and 932 may be used to determine whether the inductive power apparatus 1212 is coupled to the target device 1216. For example, the connection module 918 may use detection circuitry to determine if direct current (DC) power is available to a power management IC once current is provided through connections 926 and 928. These two events, DC power and "on current" to the separation module 334, may be used to indicate the logical state in which 1) the inductive power apparatus 1212 is coupled to the alternating current power source 102; and 2) the inductive power apparatus 1212 is coupled to the target device 1216, in which case a charge session may be initiated.

In an additional embodiment, the USB module 1252 may control the D+ and D− signals, for example, to behave like GPIO signals. The USB module 1252 may configure D+ to be a high signal (or logic 1) and feed current to the opto-coupled relay 462 using connection 926. Signal D− may be configured as a low signal to provide a return path to ground, and D− may be coupled to connection 928.

In an additional embodiment, the USB module 1252 may tie D+ and D− to internal pull up or pull down resistors. As part of the operations described in FIG. 14, the D+ may be tied to high using a pull up resistor and the D− may be tied to low using a pull down resistor to initiate the "on current" to the opto-coupled relay 462. The resistors may be of sufficient value to allow an adequate "on current" to flow to the relay.

In a further embodiment, a multiplexor may be between the USB D− and D+. During a charge session, the multiplexor may switch from USB mode to charge mode to feed a logic high voltage and ground signal to the separation module 334. The switch may be initiated by toggling the multiplexor select 1274 line.

Figure 13:
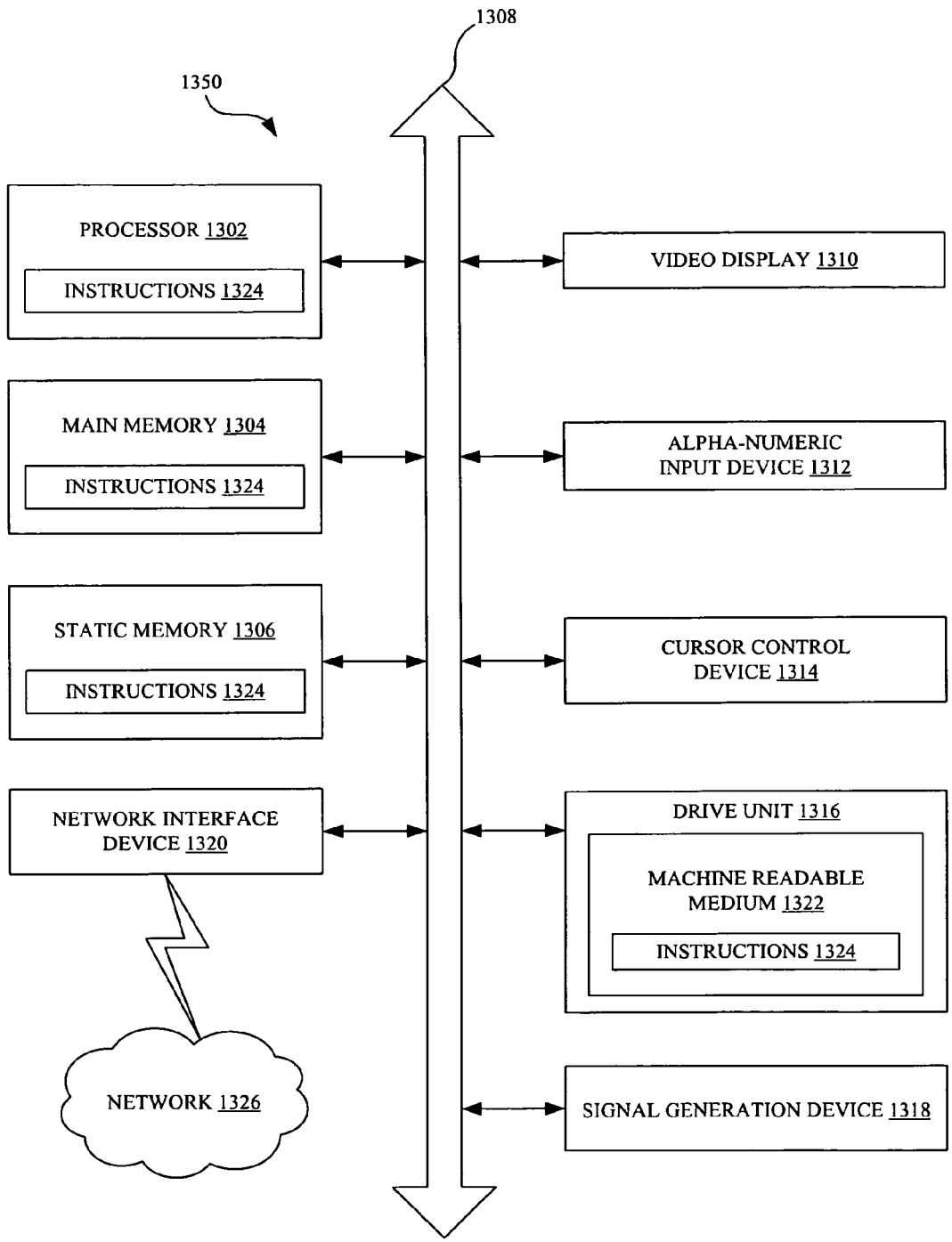
FIG. 13 is a diagrammatic system view of a data processing system that may be used with various embodiments disclosed herein, according to one embodiment.

FIG. 13 is a diagrammatic system view 1350 of a data processing system that may be used with various embodiments disclosed herein. Particularly, the diagrammatic system view 1350 of FIG. 13 illustrates a processor 1302, a main memory 1304, a static memory 1306, a bus 1308, a video display 1310, an alpha-numeric input device 1312, a cursor control device 1314, a drive unit 1316, a signal generation device 1318, a network interface device 1320, a machine readable medium 1322, instructions 1324, and a network 1326, according to one embodiment.

The diagrammatic system view 1300 may indicate a personal computer and/or the data processing system in which one or more operations disclosed herein are performed. The processor 1302 may be a microprocessor, a state machine, an application specific integrated circuit, a field programmable gate array, etc. (e.g., Intel® Pentium® processor). The main memory 1304 may be a dynamic random access memory and/or a primary memory of a computer system.

The static memory 1306 may be a hard drive, a flash drive, and/or other memory information associated with the data processing system. The bus 1308 may be an interconnection between various circuits and/or structures of the data processing system. The video display 1310 may provide graphical representation of information on the data processing system. The alpha-numeric input device 1312 may be a keypad, a keyboard and/or any other input device of text (e.g., a special device to aid the physically handicapped).

The cursor control device 1314 may be a pointing device such as a mouse. The drive unit 1316 may be the hard drive, a storage system, and/or other longer term storage subsystem. The signal generation device 1318 may be a bios and/or a functional operating system of the data processing system. The network interface device 1320 may be a device that performs interface functions such as code conversion, protocol conversion and/or buffering required for communication to and from the network 1326. The machine readable medium 1322 may provide instructions on which any of the methods disclosed herein may be performed. The instructions 1324 may provide source code and/or data code to the processor 1302 to enable any one or more operations disclosed herein.

Figure 14:
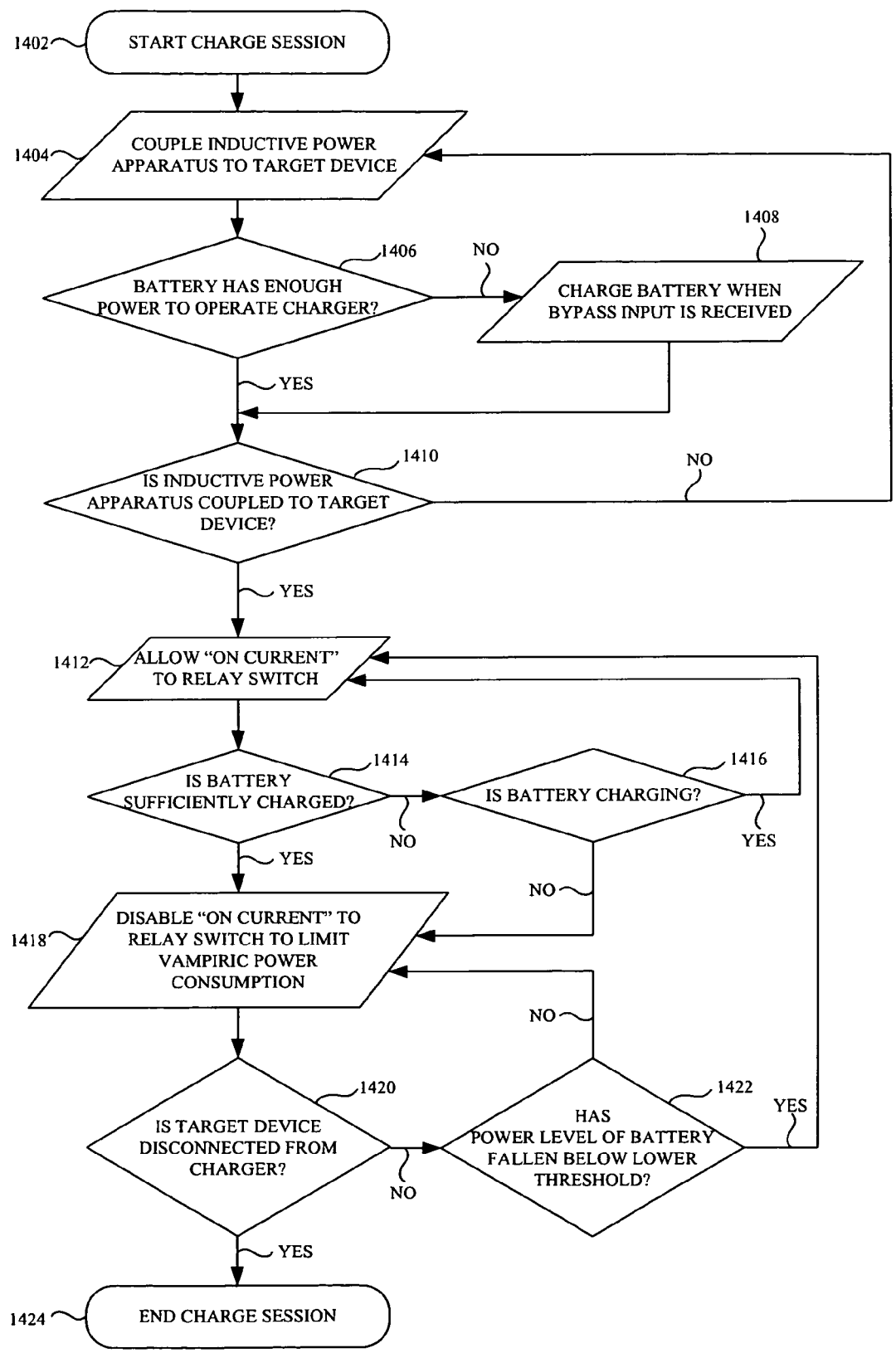
FIG. 14 is a flow chart that depicts coupling of an inductive battery charger and an alternating current source, according to one embodiment.

FIG. 14 is a flow chart that depicts coupling of an inductive power apparatus 912 and an alternating current source 102, according to one embodiment. In various embodiments, the operations with respect to FIG. 14 may be performed using the inductive battery charger 900, 1000, 1100, or 1200 interchangeably. Similarly, in various embodiments, the operations of FIG. 14 may be performed interchangeably with respect to the inductive power apparatus 912, 1112, or 1212 and the target device 916, 1116, or 1216.

In operation 1402, a charge operation is started. In operation 1404, an inductive power apparatus 912 is coupled to the target device 916, which may be a mobile device such as a mobile phone 608, a notebook computer 606, a personal digital assistant, an MP3/media player 610, or another device. In operation 1406, whether a battery has sufficient power to operate the charger is determined. The battery may be internal to the target device 916, such as an internal mobile phone 608 battery or an internal notebook computer 606 battery, and may be included as part of the supplemental power source 1048A. The battery may be attached to the inductive charging apparatus 916, and the battery may be included as part of the supplemental power source 1048B.

In operation 1408, if the battery does not have sufficient power to operate the inductive power apparatus 912 or the target device 916, then the device may wait for an external bypass input to be received by the inductive battery charger 1000. The external bypass input may be generated by a user generated contact with a user interface, such as a push button 502, a touch pad, or a mechanical switch. The bypass input may couple the inductive charging apparatus 912 to an alternating current power source 102. In an embodiment, the inductive charging apparatus 912 remains coupled to the alternating current power source 102. In another embodiment, the inductive charging apparatus 912 remains coupled to the alternating current power source 102 until the target device 916 battery is sufficiently charged.

In operation 1410, if the battery has sufficient power to operate the inductive battery charger 900, whether the inductive power apparatus 912 is coupled to the target device 916 is determined. In an embodiment, the connection module 918 communicates a feedback signal 1040 to the feedback module 924, which may include a sense feedback loop 1154. If the inductive power apparatus 912 and the target device 916 are coupled together, the sense feedback loop 1154 returns the feedback signal 1040 to the input buffer 1038. A GPIO input port may be used as the input buffer 1038, and the processor 1044 may be used by the monitoring module 920 to check the status of the GPIO input port by polling an internal register address that maps to that particular GPIO signal. If the inductive power apparatus 912 and the target device 916 are not coupled, then the process returns to operation 1404. In the embodiment, the processor 1044 may then exit the Interrupt Service Routine (ISR). If the inductive power apparatus 912 and the target device 916 are coupled, the process proceeds to operation 1412.

In another embodiment, in operation 1410, rather than use sense feedback loop 1154, the connection module 918 may determine whether the inductive power apparatus 912 is coupled to the target device 916 by monitoring current flow between the inductive power apparatus 912 and the target device 916. In the embodiment, the connection module may monitor current flowing through port 926 and/or port 928. If current is flowing through port 926 and/or port 928 when the "on current" is initiated, then the inductive power apparatus 912 may be determined to be coupled to the target device. If current is not flowing through port 926 and/or port 928 when the "on current" is activated, then the inductive power apparatus 912 and the target device 916 may be determined to be decoupled. A detection circuit of the target device 916 may monitor the current between the target device 916 and the inductive power apparatus 912. The detection circuit may be connected to an analog comparator to trigger an interrupt signal to indicate the status of the connection between the target device 916 and the inductive power apparatus 916.

In an embodiment, if the feedback signal 1040 is received, the processor 1044 will be used to write a logic '1' to a GPIO output port that is used as the output buffer 1050, which will source the "on current" to the separation module 334. In operation 1412, an "on current" is communicated to the opto-coupled relay switch 462 of the separation module 334. The "on current" may activate the alternating current circuit 114 and couple the inductive power apparatus 912 and the alternating current power source 102. The "on current" may couple the target device 916 and the target device 916 battery to the alternating current power source 102.

In operation 1414, whether the battery is sufficiently charged may be determined. The battery may be sufficiently charged based on a user determined level or predetermined charging level. Sufficient charging may be determined in accordance with a usage and/or storage pattern associated with the battery. The power level and/or charging state of the battery may be determined by a change in the rate of charging of the battery, an output voltage of the battery, or other criterion.

If the battery is not determined to be sufficiently charged after operation 1414, whether the battery is charging is determined in operation 1416. If the battery is charging, the "on current" to the opto-coupled relay 462 continues to be allowed in operation 1412. If the battery is not charging, in operation 1418, the "on current" to the opto-coupled relay 462 is disabled to limit a vampiric consumption of power. In an embodiment, when the battery is sufficiently charged, the processor 1044 may be used to write a logic '0' to the output buffer 1050, which disables the "on current" to the separation module 334, which electrically decouples the inductive power apparatus 912 and the alternating current power source 102.

If the battery is determined to be sufficiently charged after operation 1414, in operation 1418, the "on current" to the opto-coupled relay 462 is disabled to limit a vampiric consumption of power. Disabling the "on current" to the opto-coupled relay 462 may disconnect the transformer 104, the rectification circuit 106, and the voltage regulation circuit 108 from the alternating current power supply 102, depending on what components are included with or coupled to the inductive power apparatus 112.

In operation 1420, whether the target device 916 is decoupled and/or disconnected from the inductive charging apparatus 912 is determined. If the target device 916 is disconnected or decoupled from the inductive charging apparatus 912, in operation 1424, the charging process ends. If the target device 916 has not been decoupled from the inductive charging apparatus 912, in operation 1422, whether the power level of the battery has fallen below a lower threshold is determined. The check for whether the power level of the battery has fallen below a lower threshold may be made periodically or continuously, and the frequency of checking may vary. The time of checking may be associated with a lower cost of power use, which may occur during a non-peak period of power generation, which may be at night.

In an embodiment, the monitoring module 920 uses the processor 1044 to monitor the digitized strength status of the battery using the battery monitor 1046 while keeping the "on current" to the separation module 334, as described in operation 1412. In the embodiment, at operation 1414, a check of historical information on the same charge session is performed to determine if the charge strength is increasing over time. If the battery strength is not increasing over time, the control algorithm determines that the charger is not connected to the alternating current power source 102, and the processor 1044 then disables the "on current" to the separation module 334 to preserve battery strength.

Other methods to determine if the inductive power apparatus 912 is coupled to the target device 916 without the inductive power apparatus 912 being connected to the alternating current power source 102 could use an additional GPIO port configured as an input. The additional GPIO input port could be connected to the level shifted voltage of the inductive battery charger's 900 supply voltage. The additional GPIO input port may then be used to communicate a flag signal to indicate the connection status of the inductive power apparatus 912 and the alternating current power source 102.

In an additional embodiment, the check for the battery's current power level may be performed using power from a supplemental power source 1048. The supplemental power source 1048 may be attached or coupled to the target device 916, such as the target device battery 901. In another embodiment, the supplemental power source 1048 may be a separate battery or an alternate inductive power apparatus that uses less vampiric power than the inductive power apparatus 912. The alternate inductive power apparatus may use a part of the inductive power apparatus 912 rather than the whole inductive power apparatus 912 to reduce its vampiric power consumption. In an embodiment, the supplemental power source 1048 may be disposable or may be charged using the inductive power apparatus 912 when it is coupled to the alternating current power source 102.

The lower threshold power level may be determined in accordance with a user's preferences. For example, a user may prefer that a battery is kept above 80% of the battery's charge capacity, which may be determined by a manufacturer's specification, experimentation, an output voltage of the battery, a user setting, or other parameters. Alternatively, the lower threshold may be a lower predetermined level of charge that allows additional time for the inductive power apparatus 912 to be decoupled from the alternating current power source 102, which may further reduce a vampiric power consumption.

If the power level of the battery has not fallen below the lower threshold, then the "on current" to the opto-coupled relay 462 may continue to be disabled in operation 1418. If the power level of the battery has fallen below the lower threshold, then the "on current" to the opto-coupled relay 462 may be enabled in operation 1412.

In an embodiment, if the target device 916 remains connected to the inductive power apparatus 912 after the inductive power apparatus has been decoupled from the alternating current power source 102, the monitoring module 920 will monitor the strength of the battery. If the battery power level is drained past a predefined threshold, for example through standby operation or normal use, the activation module 922 will use the processor 1044 to allow "on current" to the separation module 334.

Figure 15A:
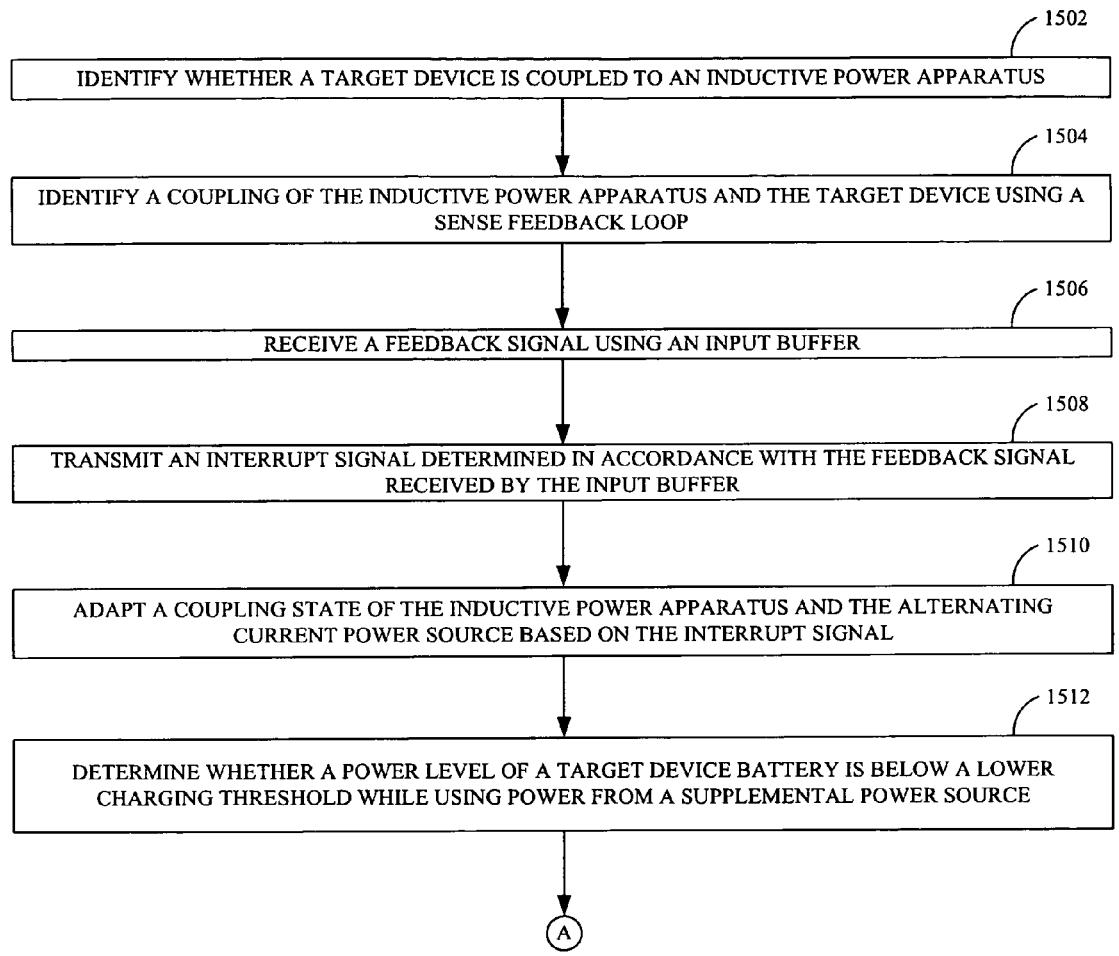
FIGS. 15A-15B illustrate a process flow to automatically couple an inductive power apparatus and an alternating current power source, according to one embodiment.
Figure 15B:
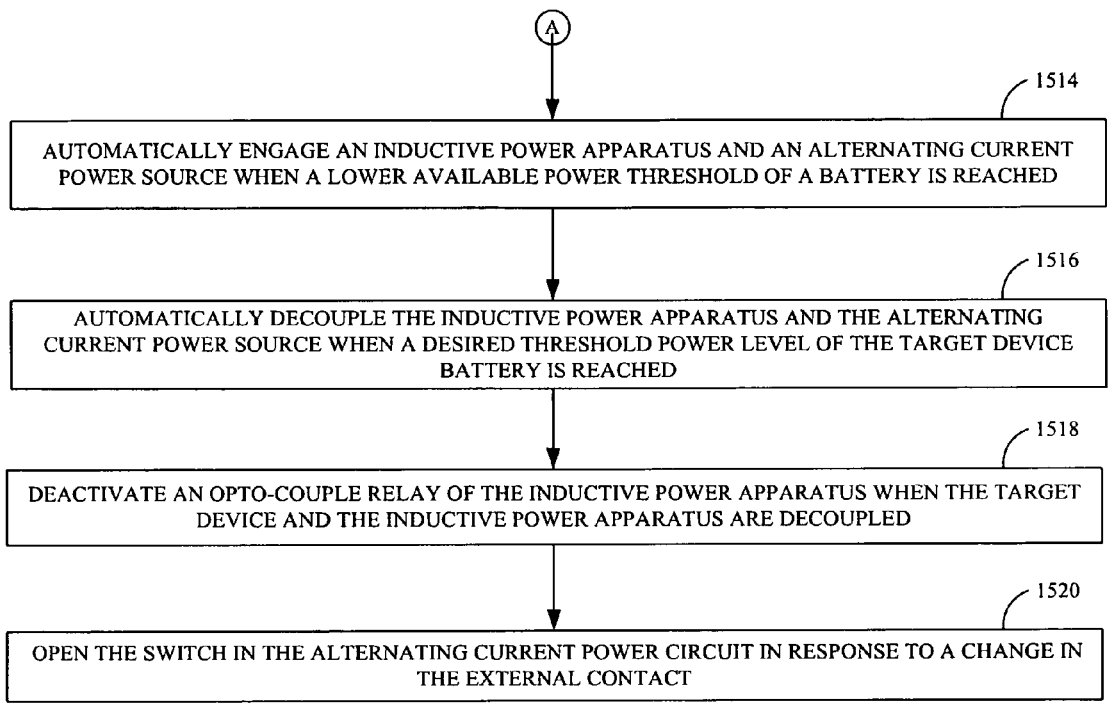

FIGS. 15A-15B illustrate a process flow to automatically couple an inductive power apparatus 912 and an alternating current power source 102, according to one embodiment. In operation 1502, whether a target device 916 is coupled to an inductive power apparatus 912 is identified. In operation 1504, a coupling of the inductive power apparatus 912 and the target device 916 is identified using a sense feedback loop 1154. In operation 1506, a feedback signal 1040 is received using an input buffer 1038. In operation 1508, an interrupt signal determined in accordance with the feedback signal 1040 received by the input buffer 1038 is transmitted.

In operation 1510, a coupling state of the inductive power apparatus 912 and the alternating current power source 102 is adapted based on the interrupt signal. In operation 1512, whether a power level of a target device 916 battery is below a lower charging threshold is determined while using power from a supplemental power source 1048. In operation 1514, an inductive power apparatus and an alternating current power source 102 are automatically engaged when a lower available power threshold of a battery is reached. In operation 1516, the inductive power apparatus and the alternating current power source 102 are automatically decoupled when a desired threshold power level of the target device battery 901 is reached. In operation 1518, an opto-coupled relay 462 of the inductive power apparatus is deactivated when the target device and the inductive power apparatus are decoupled. In operation 1520, the switch in the alternating current power circuit is opened in response to a change in the external contact.

In an embodiment, the output buffer 1050 and input buffer 1038 represent GPIO ports on a modern System on a Chip (SoC). In the embodiment, nodes 1156 and 1160 map to register addresses that are assigned by the particular SoC's memory map. In additional embodiments, many different implementation methods from the proposed invention are possible. For example, instead of using the processor 1044 resources of the target device's 1116 SoC, the control algorithms described in this application could be realized using state machines coupled with the support circuitry. The control algorithms described in this application could also be implemented using a Hardware Description Language (HDL) and incorporated directly into a power management Integrated Circuit (IC). In an additional embodiment, the control algorithms described in this application may be implemented in a standalone IC with direct access to the battery monitor 1046 of the target device 1116.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software or any combination of hardware, firmware, or software (e.g., embodied in a machine readable medium). For example, the various electrical structure and methods may be embodied using transistors, logic gates, and electrical circuits (e.g., application specific integrated (ASIC) circuitry or in Digital Signal Processor (DSP) circuitry).

Particularly, the charger module 216, the observation module 326, the filter module 328, the detection module 330, the inverter module 332, the separation module 334, the bypass module 336, the connection module 918, the monitoring module 920, the activation module 922, the feedback module 924, the input buffer 1038, the interrupt controller module 1042, the battery monitor 1046, the output buffer 1050, the USB module 1052, the connection module 1118, the feedback module 1124, the input buffer 1138, the output buffer 1150, and the USB module 1252 of FIGS. 2 through 12 may be enabled using software and/or using transistors, logic gates, and electrical circuits (e.g., application specific integrated circuitry, analog circuitry, programmable logic devices, microprocessors, etc.) such as a charger circuit, an observation circuit, a filter circuit, a detection circuit, an inverter circuit, a separation circuit, a bypass circuit, a connection circuit, a monitoring circuit, an activation circuit, a feedback circuit, an input buffer circuit, an interrupt controller circuit, a battery monitor circuit, an output buffer circuit, a USB circuit, and other circuits.

In addition, it will be appreciated that the various operations, processes, and methods disclosed herein may be embodied in a machine-readable medium or a machine accessible medium compatible with a data processing system (e.g., a computer system), and may be performed in any order (e.g., including using means for achieving the various operations). Accordingly, the Specification and Drawings are to be regarded in an illustrative rather than a restrictive sense.

What is claimed is:

1. An inductive battery charging system, comprising:
a connection module to determine when a target device is coupled to an inductive power apparatus; a monitoring module to determine when a target device battery is below a charging threshold while using power from a supplemental power source; and
an activation module to automatically couple the inductive power apparatus and an alternating current power source when a power level of the target device battery is below the charging threshold;
a separation module to automatically decouple the inductive power apparatus and the alternating current power source when a desired charging state of the target device battery is observed,
wherein the separation module is comprised of a relay switch,
wherein the inductive power apparatus includes at least one of a transformer to inductively generate an electric current, a rectification circuit, and a voltage regulation circuit.

2. The inductive battery charging system of claim 1, wherein the relay switch of the separation module is deactivated when the target device and the inductive power apparatus are decoupled.

3. The inductive battery charging system of claim 1, further comprising:
a processor of the monitoring module coupled to the target device, wherein the processor is used to evaluate a target device battery power level with respect to the charging threshold.

4. The inductive battery charging system of claim 3, further comprising:
a battery monitor coupled to the target device to determine the target device battery power level;
wherein the target device is comprised of a mobile device.

5. The inductive battery charging system of claim 1, further comprising:
a sense feedback loop of the connection module to identify whether the target device is coupled with at least one of the inductive power apparatus and the alternating current power source;
an input buffer of the connection module to receive a feedback signal; and
an interrupt controller module to generate an interrupt signal determined by the feedback signal received by the input buffer.

6. The inductive battery charging system of claim 4, further comprising:
an output buffer to generate an engage signal to control a coupling state of the inductive power apparatus and the alternating current power source.

7. The inductive battery charging system of claim 4, further comprising:
a USB module to generate an engage signal to control the coupling state of the inductive power apparatus and the alternating current power source.

8. The inductive battery charging system of claim 1, wherein the connection module determines whether the target device and the inductive power apparatus are coupled together by determining whether power is being provided to the target device by the inductive power apparatus.

9. The inductive battery charging system of claim 1, wherein the supplemental power source is comprised of at least one of a target device battery, a charger system battery and an alternate inductive power apparatus.

10. The inductive battery charging system of claim 1, further comprising:
a bypass module to initiate a charging sequence by electrically coupling the alternating current power source and the inductive power apparatus when a bypass input is detected.

11. An inductive battery charging method, comprising:
identifying whether a target device is coupled to an inductive power apparatus;
determining whether a power level of a target device battery is below a lower charging threshold while using power from a supplemental power source;
automatically engaging the inductive power apparatus and an alternating current power source when a lower available power threshold of a battery is reached;
automatically decoupling the inductive power apparatus and the alternating current power source when a desired threshold power level of the target device battery is reached, wherein the inductive power apparatus includes at least one of a transformer to inductively generate an electric current, a rectification circuit, and a voltage regulation circuit; and
deactivating an opto-coupled relay of the inductive power apparatus when the target device and the inductive power apparatus are decoupled.

12. The inductive battery charging method of claim 11, wherein the power level of the target device battery is determined using a processor and a battery monitor, and wherein the target device is comprised of a mobile device coupled to the processor and the battery monitor.

13. The inductive battery charging method of claim 12, further comprising:
identifying a coupling of the inductive power apparatus and the target device using a sense feedback loop;
receiving a feedback signal using an input buffer;
transmitting an interrupt signal determined in accordance with the feedback signal received by the input buffer; and
adapting a coupling state of the inductive power apparatus and the alternating current power source based on the interrupt signal.

14. An inductive battery charging system, comprising:
a connection module to confirm whether a target device is coupled to an inductive power apparatus, wherein the inductive power apparatus is comprised of a transformer and the target device is comprised of a mobile device;
a sense feedback loop of the connection module to identify whether the target device is coupled to an alternating current power source using at least one of a sense feedback signal and a power transmitted from the alternating current power source to the target device;
a monitoring module to detect whether a target device battery is below a charging threshold while using power from a supplemental power source;
a battery monitor coupled to the target device to determine a target device battery power level;
a processor of the monitoring module coupled to the target device, wherein the processor is used to evaluate the target device battery power level with respect to the charging threshold;
an activation module to automatically couple the target device and the alternating current power source using the inductive power apparatus when the target device battery is below the charging threshold; and
a separation module to automatically decouple the target device and the alternating current power source when a desired charging state of the target device battery is detected by the monitoring module, wherein the separation module is comprised of an opto-coupled relay.

* * * * *